(12) United States Patent
Martin

(10) Patent No.: US 10,517,349 B2
(45) Date of Patent: Dec. 31, 2019

(54) BICYCLE SHOE TO PEDAL CLEAT SHIM AND MOUNTING

(71) Applicant: Christopher Martin, Karrinyup (AU)

(72) Inventor: Christopher Martin, Karrinyup (AU)

( * ) Notice: Subject to any disclaimer, the term of this patent is extended or adjusted under 35 U.S.C. 154(b) by 137 days.

(21) Appl. No.: 15/512,450

(22) PCT Filed: Sep. 19, 2015

(86) PCT No.: PCT/AU2015/050563
§ 371 (c)(1),
(2) Date: Mar. 17, 2017

(87) PCT Pub. No.: WO2016/041021
PCT Pub. Date: Mar. 24, 2016

(65) Prior Publication Data
US 2018/0146741 A1    May 31, 2018

(30) Foreign Application Priority Data

Sep. 20, 2014  (AU) .................. 2014903768
Apr. 24, 2015  (AU) .................. 2015901478
Apr. 24, 2015  (AU) .................. 2015901479

(51) Int. Cl.
*A43B 5/14*  (2006.01)
*B62M 3/08*  (2006.01)

(52) U.S. Cl.
CPC ............... *A43B 5/14* (2013.01); *B62M 3/086* (2013.01)

(58) Field of Classification Search
CPC .......... B62M 3/08; B62M 3/083; B62M 3/10; B62M 3/16; B62M 3/086; A43B 5/14; F16B 43/02

(Continued)

(56) References Cited

U.S. PATENT DOCUMENTS 4,704,809 A * 11/1987 Ballard .................. A43B 5/001
                                                              36/127
4,827,797 A    5/1989 Le Faou et al.
(Continued)

FOREIGN PATENT DOCUMENTS

DE            10000416 A1 *  7/2001  ............... A43B 5/14
DE     202016005888 U1 * 10/2016  .............. B62M 3/08
(Continued)

OTHER PUBLICATIONS

Machine translation of WO 2006/045281 A1 obtained on Nov. 28, 2018.*
(Continued)

*Primary Examiner* — Adam D Rogers
(74) *Attorney, Agent, or Firm* — Kim IP Law Group PLLC

(57) ABSTRACT

An improved bicycle shoe to pedal cleat shim comprises a shim body with mating faces on opposite sides of the shim body, each for mating with another surface, each mating face having two or more shim to shim keying features. There is also a cleat with two or more cleat to shim keying features. There is also a mounting screw with a convex curved seating face and a washer with a substantially matching mating concave curved seating face. The screw has one or more grooves incrementally cut along the length of the thread. The shim has thickness marks adjacent to the screw relief pocket on the shim. There is also a cleat with the cleat to shoe/shim mating face having one or more friction inducing pads that comprise a pocket to allow space for friction material to flow when the cleat is mated to the shoe, shim or another shim.

18 Claims, 31 Drawing Sheets

(58) Field of Classification Search
USPC .................................................. 36/131, 134
See application file for complete search history.

(56) References Cited

U.S. PATENT DOCUMENTS

| | | | |
|---|---|---|---|
| 5,199,192 A * | 4/1993 | Kilgore .................... | A43B 5/14 36/131 |
| 5,213,009 A * | 5/1993 | Bryne ..................... | B62M 3/086 74/594.4 |
| 5,797,912 A | 8/1998 | Runciman et al. | |
| 5,860,330 A | 1/1999 | Code et al. | |
| 5,927,155 A * | 7/1999 | Jackson ................... | B62M 3/08 74/594.4 |
| 6,477,793 B1 * | 11/2002 | Pruitt ....................... | A43B 5/14 36/103 |
| 6,494,117 B1 * | 12/2002 | Bryne ..................... | B62M 3/086 36/132 |
| 6,560,934 B1 | 5/2003 | Workman | |
| 7,017,445 B2 * | 3/2006 | Bryne ..................... | B62M 3/086 74/560 |
| 7,178,272 B2 * | 2/2007 | Xie .......................... | A43B 5/14 36/131 |
| 8,453,353 B2 * | 6/2013 | Xie .......................... | A43B 5/14 36/131 |
| 2002/0170382 A1 | 11/2002 | Yang | |
| 2012/0227287 A1 | 9/2012 | Czan | |
| 2014/0075786 A1 | 3/2014 | Bryne | |

FOREIGN PATENT DOCUMENTS

| | | |
|---|---|---|
| EP | 0600154 A1 | 6/1994 |
| EP | 2799326 A1 | 11/2014 |
| GB | 2115510 B | 10/1985 |
| WO | WO-2006045281 A1 * | 5/2006 ............. F16B 5/025 |

OTHER PUBLICATIONS

International Search Report dated Mar. 17, 2016 in international Application No. PCT/AU2015/050563.

Written Opinion dated Mar. 17, 2016 in international Application No. PCT/AU2015/050563.

International Preliminary Report on Patentability dated Feb. 20, 2017 in International Application No. PCT/AU2015/050563.

* cited by examiner

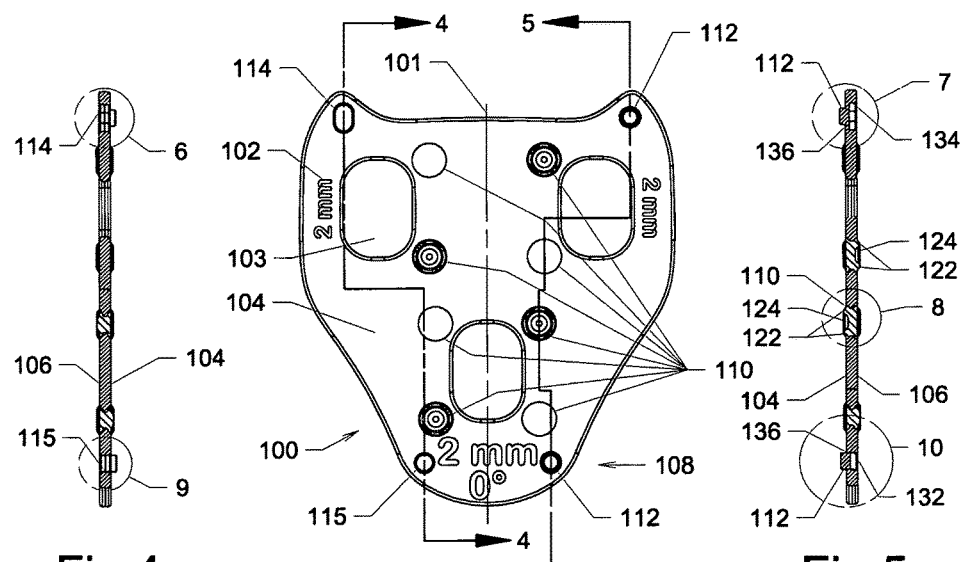
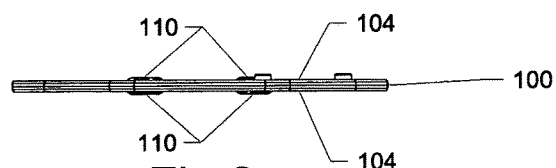
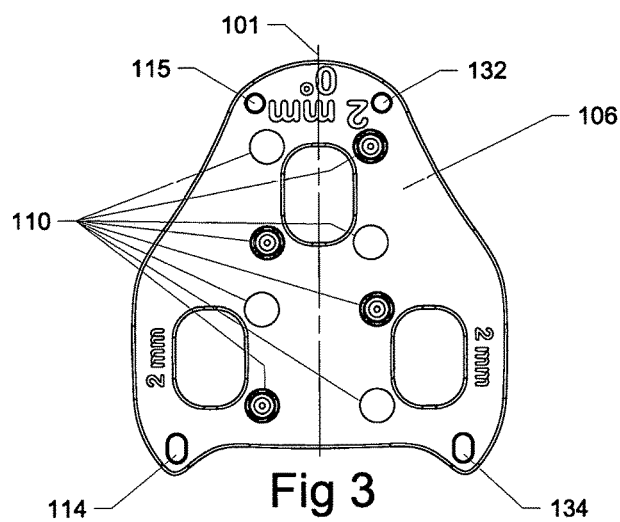

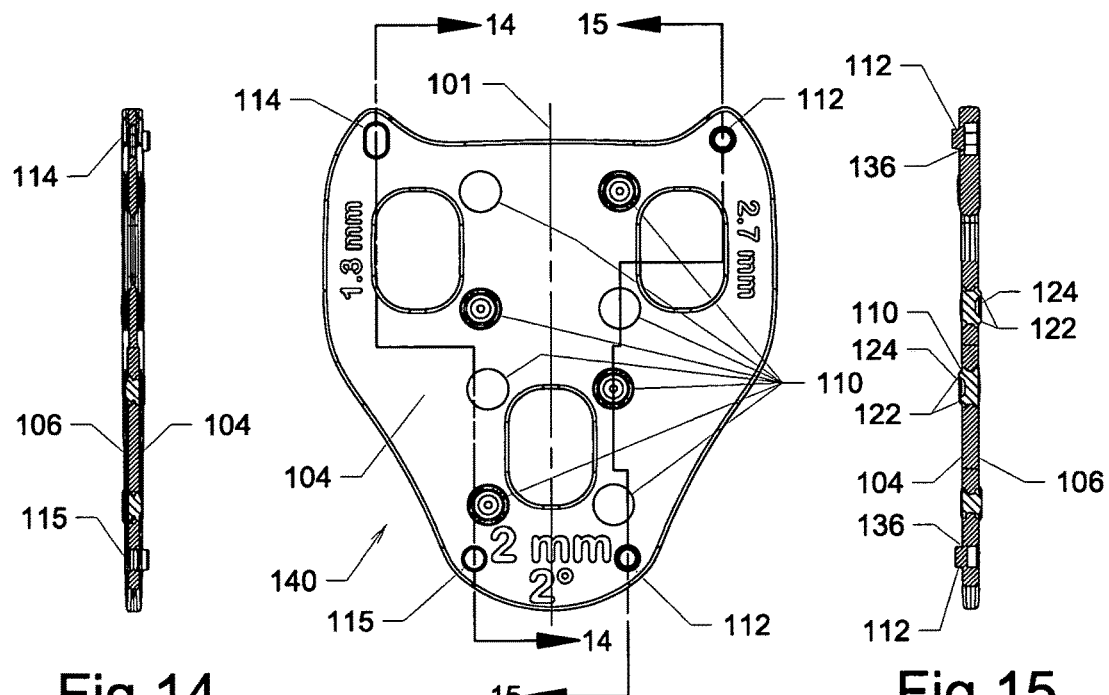
Fig 14 | Fig 11 | Fig 15
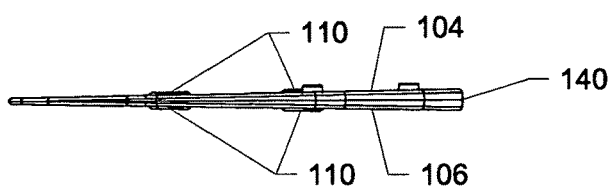
Fig 12
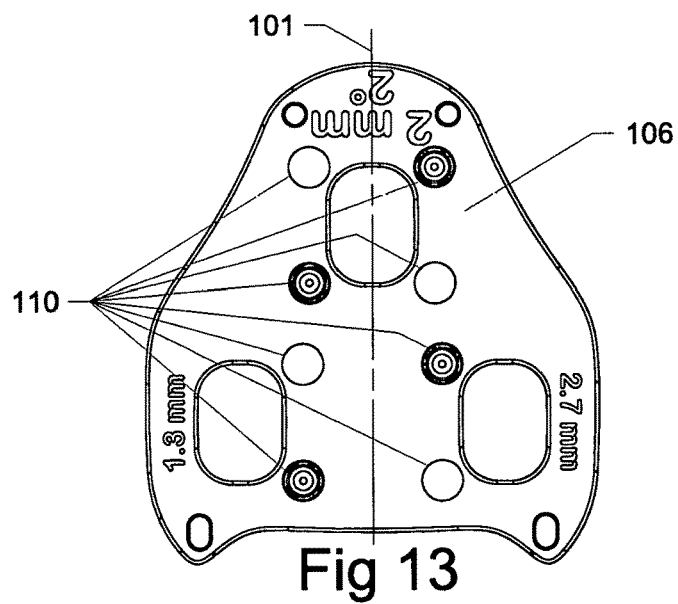
Fig 13

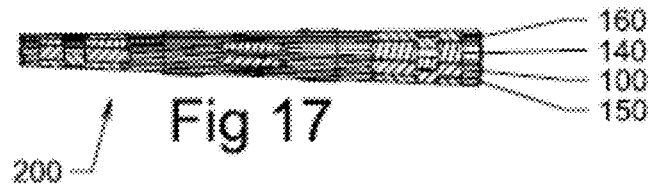
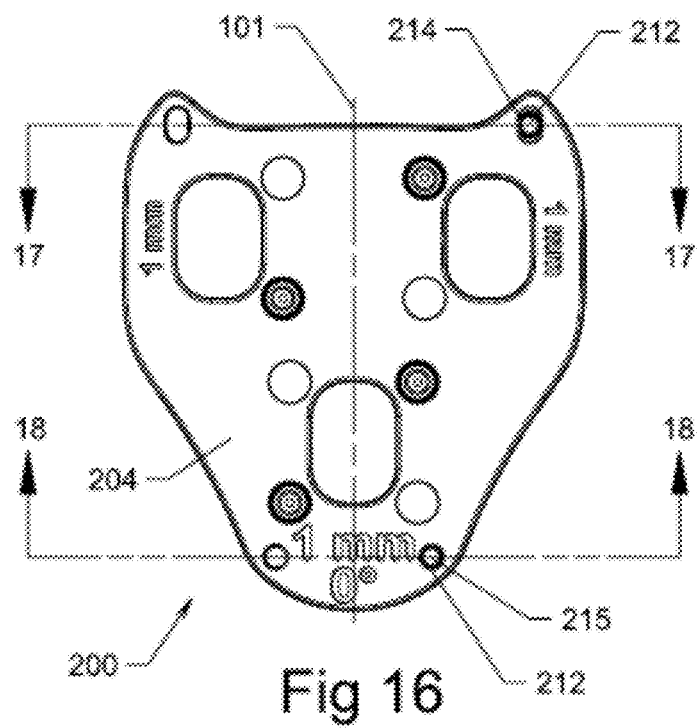
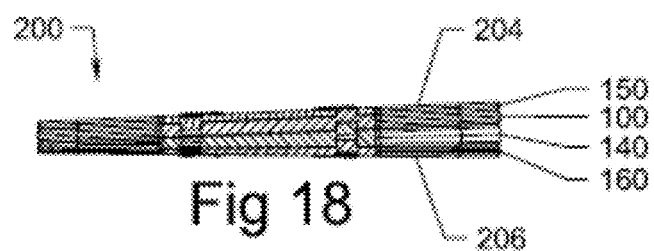

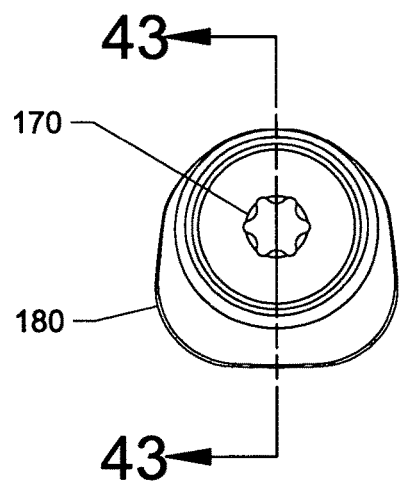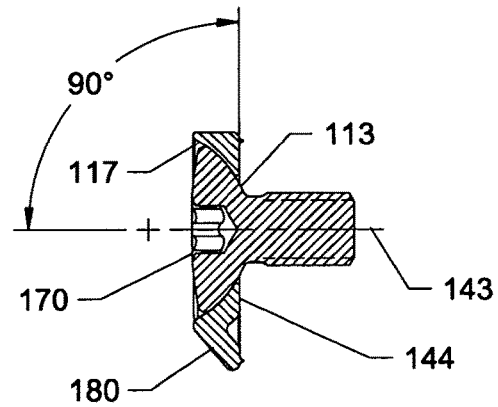
Fig 42
Fig 43
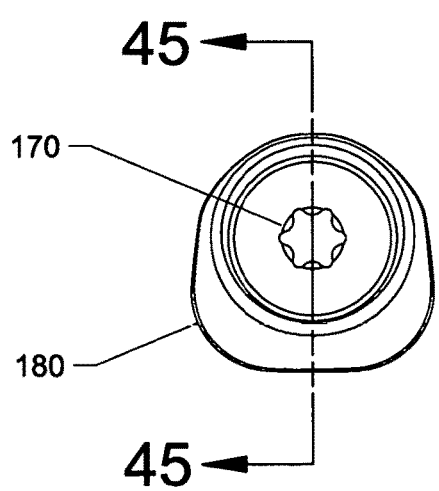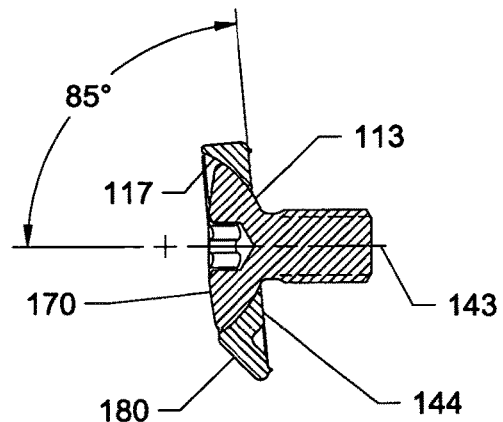
Fig 44
Fig 45

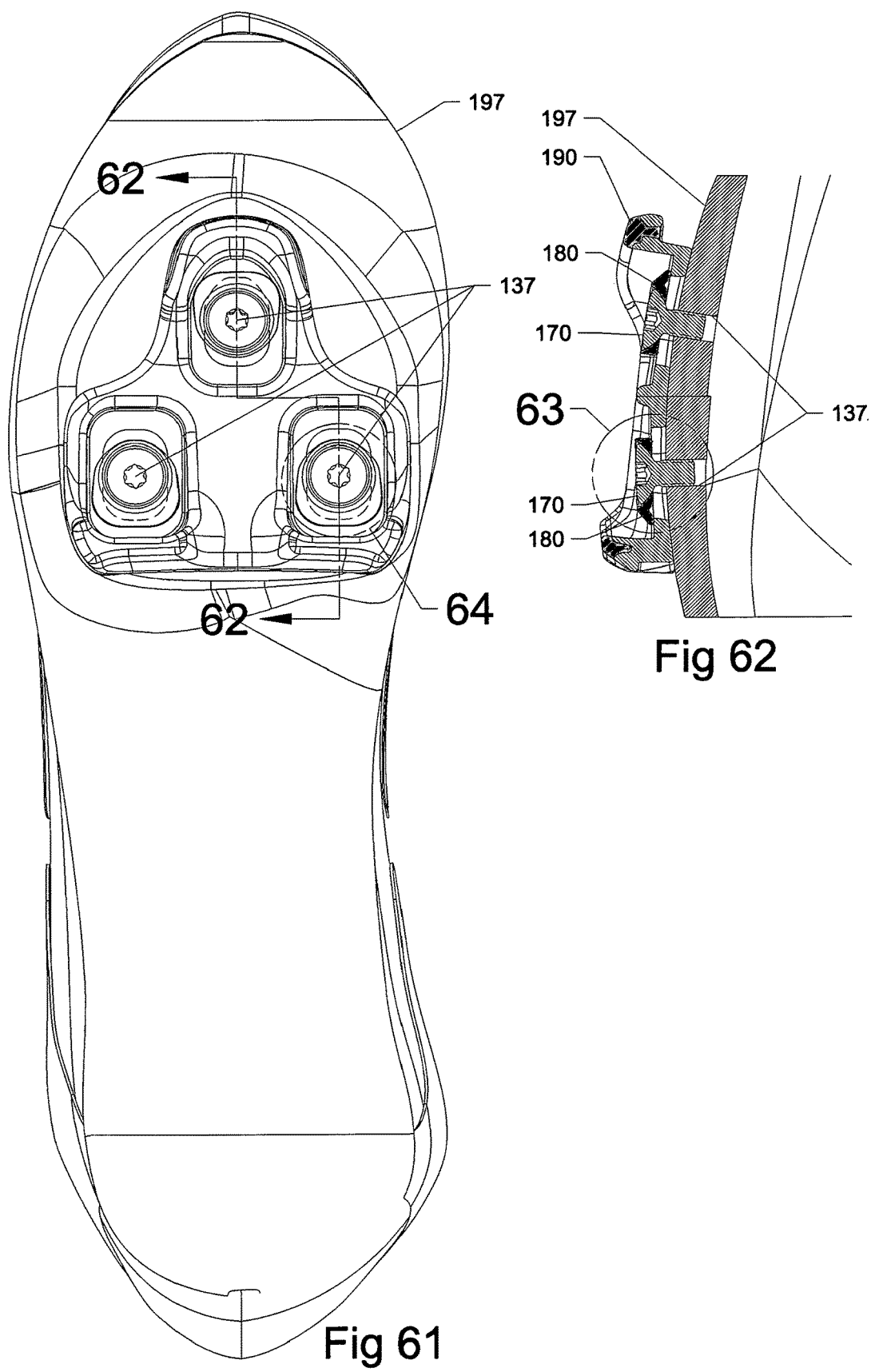

US 10,517,349 B2

BICYCLE SHOE TO PEDAL CLEAT SHIM AND MOUNTING

CROSS-REFERENCE TO RELATED APPLICATIONS

This application is a national phase application under 35 U.S.C. § 371 of International Application No. PCT/AU2015/050563 filed Sep. 19, 2015, which claims foreign priority to Australian Patent Application No. 2014903768 filed Sep. 20, 2014, Australian Patent Application No. 2015901478 filed Apr. 24, 2015, and Australian Patent Application No. 2015901479 filed Apr. 24, 2015, the entire disclosures of which are hereby incorporated by reference in their entirety.

FIELD OF THE INVENTION

The present invention relates to shims used to adjust the angle and or height offset of a cyclist's shoe relative to a pedal cleat of a bicycle shoe and to mounting of the shoe to the cleat.

BACKGROUND

As people often have slightly asymmetrical bodies there is a need to adjust the angle and offset of a bicycle rider's foot in relation to the bicycle pedal. When the rider is using a bicycle shoe, cleat and pedal combination one way of adjusting to suit the rider is to move the cleat forward, backward, left and right and also rotating the cleat. To achieve this cleats are often made with slots and washers that are slotted to fit in the cleat slots to allow for the movement. Another option of adjusting to suit the rider is to shim the cleat angle and offset from the pedal. Shims need to fit both the left and right shoe to cleat interface which is often curved. To achieve this shims are often made of thin flexible plastic stacked to create the desired offset and angle. Additionally the cleat and shim stacks are susceptible to movement caused by slippage between the screw to washer, washer to cleat, shoe to cleat, shim to shoe, shim to shim and shim to cleat interfaces. This in turn allows the screws to loosen and thus altering the rider's settings. It also allows for damage to the shoe from excessive torque movement of the screws. To alleviate this shims are often glued in place with double sided tape.

Additionally when a shim stack is required it is often difficult to acquire the correct length screws. To alleviate this screw kits are often provided with many multiple different lengths screws.

An aspect of the present invention has been devised in order to provide an improved interface between the shoe to shim, shim to shim and shim to cleat interfaces to hold the shim stack firmly in place thereby alleviating undesirable slipping.

An aspect of the present invention has been devised in order to provide an improved interface between the screw and washer, and washer to cleat interfaces to hold the cleat or cleat and shim stack firmly in place thereby alleviating undesirable slipping. An offset washer thus allowing for adjustments in location of the cleat or cleat and shim pack whilst maintaining surface area between the washer and cleat. An adjustable length screw thus reducing the number of screws required in the kits. Dual use rubber-like friction inducing pads/pins on the cleat to reduce slippage between the cleat and shoe, or the cleat and shim. Rubber-like friction inducing pads on the cleat reduce slippage between the cleat and shoe, or the cleat and shim.

SUMMARY OF THE INVENTION

According to the present invention there is provided an improved bicycle shoe to pedal cleat shim comprising a shim body with mating faces on opposite sides of the shim body, each for mating with another surface, each mating face having two or more shim to shim keying features.

In an embodiment the mating faces are either parallel or angled with respect to each other.

In an embodiment the other surface is one of the following: a pedal cleat, a bicycle shoe, or another mating surface of another shim.

In an embodiment the faces further comprise one or more friction inducing pads.

In an embodiment the faces further comprise a non-slip texture on the remaining surface of the mating faces.

In an embodiment the keying features comprise two or more pins offset to the same side of a heel to toe centreline of the shim on one of the mating faces.

In an embodiment the keying features comprise two or more sockets on the other mating face for receiving pins of another shim, wherein the sockets are to the same side of the heel to toe centreline as the pins.

In an embodiment the keying features comprise two or more sockets on the same mating face as the face with the pins and are for receiving pins of another shim, wherein the sockets are on the opposite side of the heel to toe centreline as the pins.

In an embodiment the keying features comprise two or more sockets on the other mating face for receiving pins of another shim, wherein the sockets are to the same side of the heel to toe centreline as the pins.

In an embodiment the keying features comprise two or more sockets on the other mating face for receiving pins of another shim, wherein the sockets are spaced symmetrically about the heel to toe centreline of the shim.

In an embodiment each sockets is one of: a socket through the shim, back to back sockets or a socket on the other side of a pin.

In an embodiment the shim is stackable on another shim, wherein each pin of the shim is on the same side of the centre line, and the pins of the other shim are received in the sockets of the first shim.

In an embodiment the shim is stackable with another shim, wherein each pin of the first shim is on the opposite side of the pins of the other shim and all of the pins are receiving in respective sockets.

In an embodiment at least one of the pins of the shim is round. In an embodiment at least one of the sockets is round. In an embodiment at least one of the sockets is a rounded rectangle. In an embodiment the length of the rectangle is substantially parallel to the centreline of the shim. In an embodiment the length of the rectangle is aligned with a line through the pins.

In an embodiment each pin is positioned in line with a corresponding one of the sockets of the other mating face on the same side of centreline of the shim and is connected to the shim body by a thin section of material parallel to the mating face.

In an embodiment each pin is readily removable. In an embodiment each pin is susceptible to removable by application of a force substantially perpendicular to the mating face, or by application of a torque applying force to the pin.

In an embodiment each friction inducing pad comprises a protrusion above the mating faces. In an embodiment each friction inducing pad comprises a pocket to allow space for the friction material to flow when the shim is mated to the shoe, cleat or another shim.

In an embodiment the friction inducing pads are located within the cleat footprint and avoid pockets in the cleat. In an embodiment the friction inducing pads are rubber-like. In an embodiment the friction inducing pads are formed of a Thermoplastic Elastomer.

In an embodiment the non-slip texture is formed of pitting in the surface of the remaining surface of the shim faces.

In an embodiment the non-slip texture is formed by a thin rubberised surface to the shim faces that will substantially avoid creep under compression, but is flexible longitudinally.

According to the present invention there is provided an improved bicycle shoe to pedal cleat shim comprising a shim body with mating faces on opposite sides of the shim body, each for mating with another surface, each mating face having one or more friction inducing pads.

According to another aspect of the present invention there is provided a stack of improved bicycle shoe to pedal cleat shims comprising at least two shims, where each shim comprises a shim body with mating faces on opposite sides of the shim body, each for mating with another surface, each mating face having two or more shim to shim keying features.

In an embodiment the mating faces of each shim are either parallel or angled with respect to each other and collectively the external faces of the stack contact a pedal cleat and a bicycle shoe, respectively, such that the offset and angle between the shoe and the cleat is adjusted by the stack.

In an embodiment the keying features of at least one of the shims comprises two or more pins offset to the same side of a heel to toe centreline of the shim on one of the mating faces and one of the following is the case: each pin of at least two of the shims is on the same side of the centre line, and the pins of the other shim are received in the sockets of the first shim; or each pin of a first of the shims is on the opposite side of the pins of another of the shims and all of the pins are received in respective sockets.

According to the present invention there is provided an improved bicycle shoe to pedal cleat mounting comprising a screw with a convex curved seating face and a washer with a substantially matching mating concave curved seating face. This allows for the seating face of the washer to be out of square to the screw hole centreline without applying a torque load to the head of the screw and point contact to the washer.

In an embodiment the curves have constant radii of curvature. In an embodiment the radii are substantially the same.

In an embodiment a centreline of the washer curved face (washer seat) is offset to the washer centreline, allowing for the washer to be turned in a slot of the cleat permitting greater movement of the cleat whilst maintaining surface area between the washer and cleat body, and keeping the load force over the centre point of the washer to screw interface.

In an embodiment the centreline of the washer seat and the washer body are the same.

In an embodiment the washer may be a plate having two or more seats pitched to match the screw holes of the mating shoe to accommodate multiple screws.

In an embodiment the washer is generally a polygon, preferably rectangular, in shape.

In an embodiment the washer is generally trapezoidal in shape.

In an embodiment the washer is round in shape giving the washer to cleat more movement without having to remove then turn the washer.

In an embodiment the washer has protrusions to bite into the cleat body so the washer is less likely to slip.

In an embodiment the screw material is Alloy steel. In an embodiment the screw material is Titanium. In an embodiment the washer material is High Carbon steel. In an embodiment the washer material is Titanium.

In an embodiment screw comprises one or more grooves cut along the length of the thread for creating marks for the screw to be cut to length whilst maintaining a clean thread start.

According to the present invention there is provided an improved bicycle shoe to pedal cleat mounting comprising a screw with one or more grooves incrementally cut along the length of the thread thus creating marks for the screw to be cut to length whilst maintaining a clean thread start.

In an embodiment the grooves incrementally cut along the length of the screw are coloured, preferably in a contrasting colour to the screw, thus making them more visible.

In an embodiment the screw material is Alloy steel. In an embodiment the screw material is Titanium.

According to the present invention there is provided an improved bicycle shoe to pedal cleat mounting comprising a shim with thickness marks adjacent to the screw relief pocket on the shim so the length of screw required can be easily calculated.

In an embodiment the shim angle is marked on the shim for easy identification and so the total angle of the stack can be easily calculated.

According to the present invention there is provided an improved bicycle shoe to pedal cleat mounting comprising a cleat with the cleat to shoe/shim mating face having one or more friction inducing pads that comprises a pocket to allow space for friction material flow when the cleat is mated to the shoe, shim or another shim.

In an embodiment the friction inducing pads are formed of a Thermoplastic Elastomer.

According to the present invention there is provided an improved bicycle shoe to pedal cleat mounting comprising a cleat with the cleat to shoe or shim mating face having two or more cleat to shim keying features.

In an embodiment the keying features comprise two or more pins.

In an embodiment the keying features comprise two or more sockets.

In an embodiment the keying feature is dual use being made from rubber-like material to create friction inducing pads or pins. Each pad or pin is readily removable.

In an embodiment the friction inducing pads comprise a pocket to allow space for the friction material to flow when the cleat is mated to the shoe, shim or another shim.

In an embodiment each pad or pin is susceptible to removable by application of a cutting force substantially parallel to the mating face.

In an embodiment the dual use keying feature or friction inducing pads are formed of a Thermoplastic Elastomer In this specification the terms "comprising" or "comprises" are used inclusively and not exclusively or exhaustively.

Any references to documents that are made in this specification are not intended to be an admission that the information contained in those documents form part of the common general knowledge known to a person skilled in the field of the invention, unless explicitly stated as such.

DESCRIPTION OF DRAWINGS

The present invention may be better understood with reference to the illustrations of embodiments of the invention, in which:

FIG. 1 is a plan view of an embodiment of an improved bicycle shoe to pedal cleat shim, with a mating face having pins and parallel mating faces.

FIG. 2 is an end view of the shim of FIG. 1.

FIG. 3 is a plan view of an embodiment of an improved bicycle shoe to pedal cleat shim, with a mating face without pins and parallel mating faces.

FIG. 4 is a section view of the shim of FIG. 1, with the section 4-4 passing through sockets.

FIG. 5 is a section view of the shim of FIG. 1, with the section 5-5 passing through pins with opposing sockets.

FIG. 11 is a plan view of an embodiment of an improved bicycle shoe to pedal cleat shim, with a mating face having pins and a 2 Degree angle between the mating faces.

FIG. 12 is an end view of the shim of FIG. 11.

FIG. 13 is a plan view of an embodiment of an improved bicycle shoe to pedal cleat shim, with a mating face without pins and a 2 Degree angle between the mating faces.

FIG. 14 is a section view of the shim of FIG. 11, with the section 14-14 passing through sockets.

FIG. 15 is a section view of the shim of FIG. 11, with the section 15-15 passing through pins with opposing sockets.

FIG. 16 is a plan view of a stack of improved bicycle shoe to pedal cleat shims according to embodiments of the present invention.

FIG. 17 is a section view of the stack in FIG. 16, through the section 17-17.

FIG. 18 is a section view of the stack in FIG. 16, through the section 18-18.

FIG. 42 is a plan view of the screw and washer assembled, with the washer mating face being square to the screw centreline.

FIG. 43 is a section view of the screw and washer assembly of FIG. 42, with the section 43-43 passing through the centreline of the spherical seat.

FIG. 44 is a plan view of the screw and washer assembled, with the washer mating face not square to the screw centreline.

FIG. 45 is a section view of the screw and washer assembly of FIG. 44, with the section 45-45 passing through the centreline of the spherical seat.

FIG. 61 is a plan view of the improved bicycle shoe to pedal cleat mounting assembled, showing the bottom face of the shoe with the cleat positioned centrally.

FIG. 62 is a section view of the assembly of FIG. 61, with the section 62-62 passing through the centreline of the screw holes.

DETAILED DESCRIPTION OF EXAMPLE EMBODIMENTS

Figure 6:
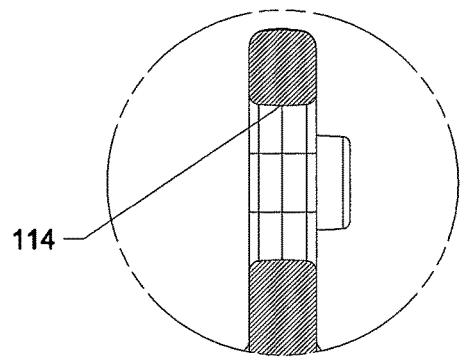
FIG. 6 is an enlarged detail '6' taken from section view FIG. 4.
Figure 7:
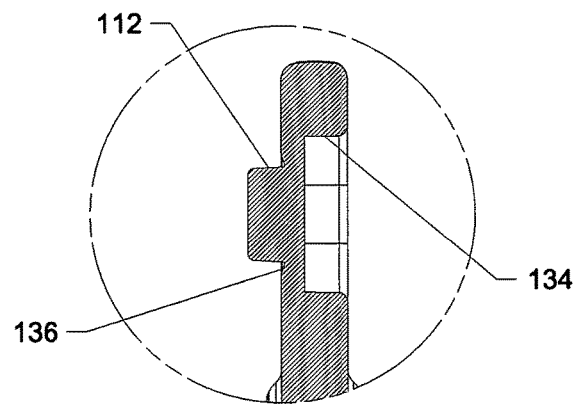
FIG. 7 is an enlarged detail '7' taken from section view FIG. 5.
Figure 8:
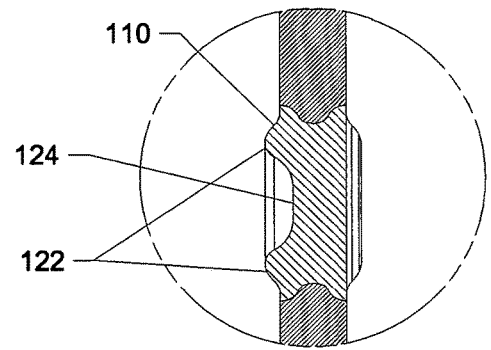
FIG. 8 is an enlarged detail '8' taken from section view FIG. 5.
Figure 9:
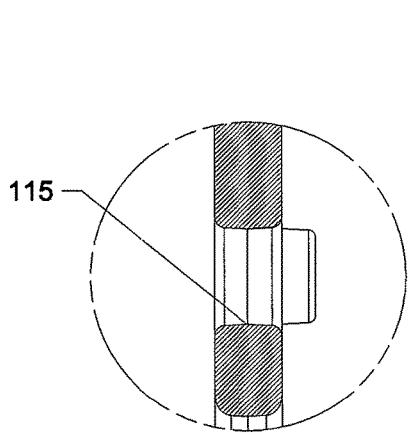
FIG. 9 is an enlarged detail '9' taken from section view FIG. 4.
Figure 10:
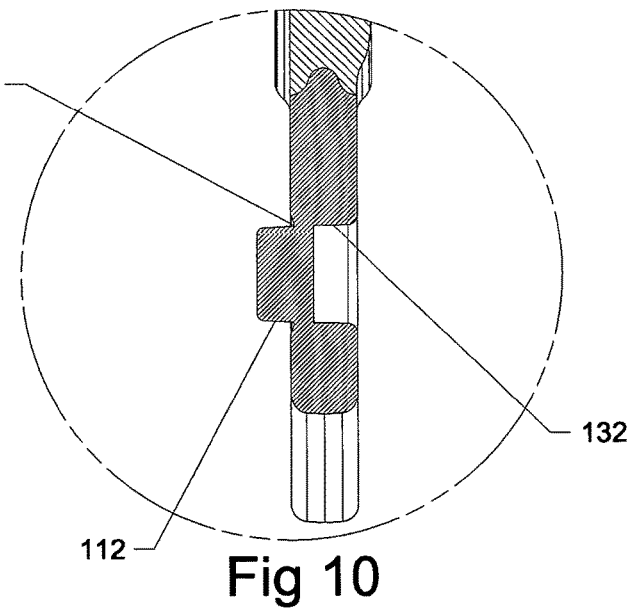
FIG. 10 is an enlarged detail '10' taken from section view FIG. 5.

Referring to FIGS. 1 to 10 there is shown a 2 mm thick parallel improved bicycle shoe to pedal cleat shim 100 comprising a shim body 102 having opposed mating faces 104 and 106. The preferred base material for the shim body 102 is Polyamide (PA), however other materials can also be used.

The faces 104 and 106 are parallel for this shim 100. The shim 100 is generally "heart" shaped or "fox" shaped with a narrower end at the bottom of the figure (toe end) and with lobes or "ears" at the top of FIG. 1 (heel end). The body 102 may have apertures there through. Extending heel to toe wise is a centre line 101. The body 102 is symmetrical about the centre line 101.

The face 104 comprises shim keying features. The shim to shim keying is of such a design as to allow for assembly of shim to shim with the keying features either facing each other or facing the same direction. In this embodiment the keying features are in the form of pins 112 and sockets 114 and 115, and 132 and 134. Preferably there are only two pins 112 offset to the same side of the centreline 101. Adding more may increase the chance of misalignment and thus increase manufacturing costs and increase the reject rate. The face 106 comprises shim keying features in the form of sockets 114, 115, 132 and 134. Face 106 does not have pins.

The faces 104 and 106 also comprise one or more friction inducing pads 110. The faces 104 and 106 further comprise a non-slip texture on their respective remaining surface area.

The sockets 132 and 134 are for receiving pins of another shim and are to the same side of the centreline 101 as the pins 112. The sockets 114 and 115 of face 104 are for receiving pins of another shim and the sockets 114 and 115 are on the opposite side of the centreline 101 as the pins 112.

The sockets 114 and 115 of face 106 are for receiving pins of another shim and the sockets 114 and 115 are on the opposite side of and are spaced symmetrically about the centreline 101 as the sockets 132 and 134.

Sockets 114 and 115 may be back to back sockets, but are preferably formed from a hole through the shim body 102. Sockets 132 and 134 are on the other side of the body 102 for the correspondingly positioned pin 112 on the face 104.

In this embodiment the pins 112 are round and the sockets 115 and 132 are round. Sockets 114 and 134 are elongate and are preferably formed of a rectangle adapted with rounded corners or rounded ends. In an embodiment the length of the rectangle is substantially parallel to the centreline 101. In an embodiment the length of the rectangle is aligned with a line through the pins 112.

Each friction inducing pad 110 comprises a protrusion 122 above the mating faces 104 and 106. In an embodiment each of the friction inducing pads comprises a pocket 124. The friction inducing pads are of such a design to allow friction material to protrude above the mating faces and also have pockets to allow space for the friction material flow when the shim 100 is mated to the shoe, cleat or another shim, thus allowing the shim to resist forces applied parallel to the mating face with minimum force at 90 degrees to the mating face.

In an embodiment the friction inducing pads 110 are located within the cleat footprint and avoid pockets in the cleat. In an embodiment the friction inducing pads 110 are rubber-like. In an embodiment the friction inducing pads are formed of a Thermoplastic Elastomer, however other materials can also be used.

In an embodiment the non-slip texture is formed with pitting in the surface of the remaining surface of the shim faces 104 and 106.

In an embodiment the non-slip texture is formed by a thin rubberised surface to the shim faces 104 and 106 that will substantially avoid creep under compression, but is flexible longitudinally to accommodate the shoe and cleat interfaces.

The preferred rubberised friction inducing material is Thermoplastic Elastomer (TPE), however other materials can also be used.

In an embodiment the shim is stackable on another shim. When assembling the stack, it is optimal for the pins to face away from the mating face on the shoe. Preferably the first shim is oriented so that each pin 112 of the first shim is on the opposite side of the pins of the other shim and all of the pins are receiving in respective sockets.

However in some cases each pin 112 of the shim is on the same side of the centre line 101, and the pins 212 of the other shim(s) are received in the sockets of the first shim.

In an embodiment each pin 112 is connected to the shim body 104 by a thin section 136 of material parallel to the mating face 104 so that it is readily removable by application of a force substantially perpendicular to the mating face 104, or by application of a torque applying force to the pin 112. In circumstances such as when the end pin comes in contact with the shoe or the cleat, the pins are of such a design to allow for easy removal of the pin 112 by means of breaking the pin 112 and removing it from the shim 100.

The pin 112 may also be drilled out using the corresponding socket as a guide. For optimal configuration a corresponding socket would be applied to the shoe and cleat.

Other forms of improved bicycle shoe to pedal cleat shim may be any thickness, such as but not limited to 1 mm, 2 mm, 3 mm and 5 mm and any angle such as 1 Degree, 2 Degree, 3 Degree and 5 Degree with 1 mm to 2 mm thickness being optimal to allow the shims to flex to fit the shape of the shoe to cleat interface.

Further example of shims according to embodiments of the invention and stacks of such shims are described in the examples below.

FIGS. 11 to 15 show a 2 mm thick, 2 Degree angled shim 140. The shim 140 is similar to shim 100, with the principal difference being the angle between the faces 104 and 106 is 2 Degrees, such that the shim is wedge shaped in the end view of FIG. 12. This allows for correction of the angle of the shoe to the pedal cleat according to the orientation of shim 140. That is, the orientation may be as shown in FIG. 12, or it may be inverted, in which case the angle of correction will be in the opposite direction.

Figure 19:
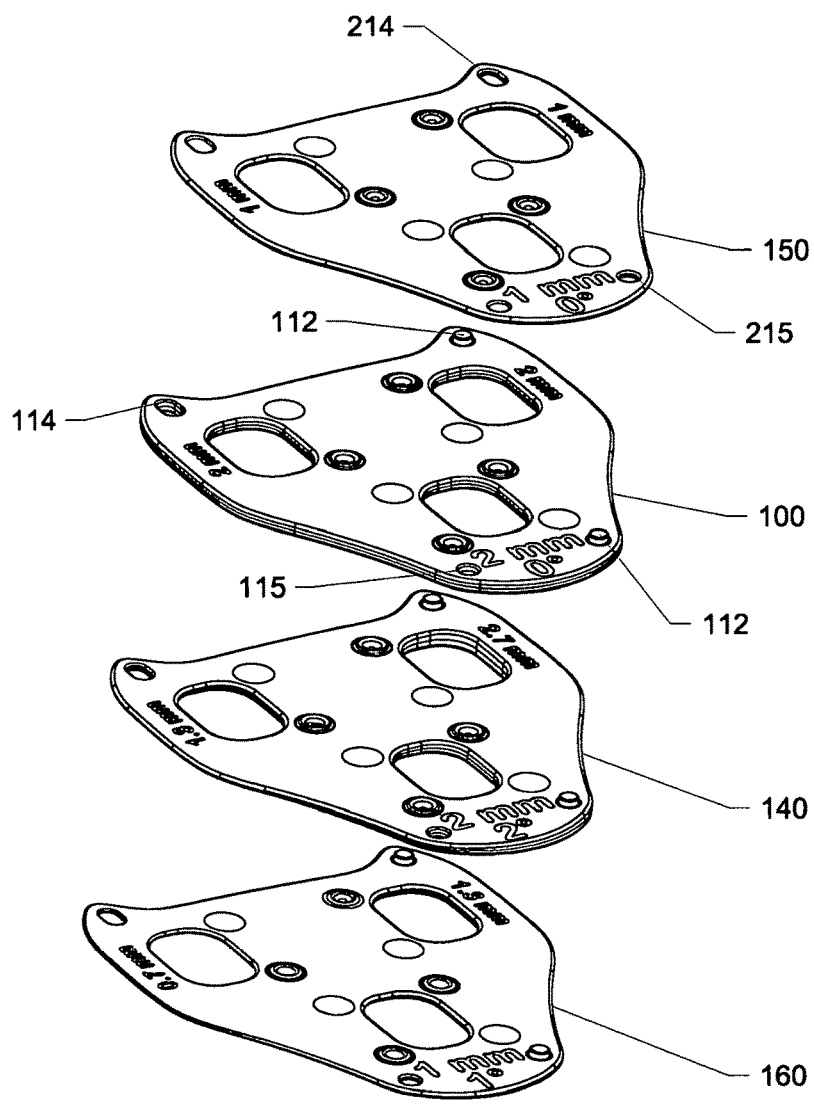
FIG. 19 is an exploded pictorial view of the stack in FIG. 16.
Figure 20:
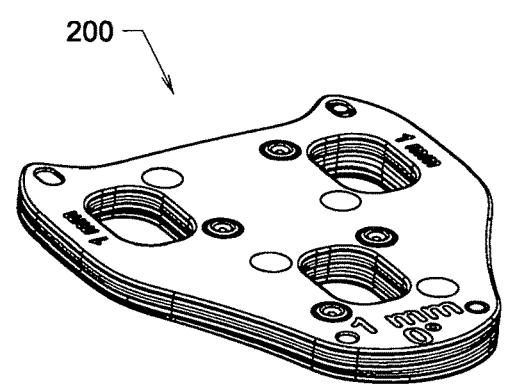
FIG. 20 is a pictorial view of the stack in FIG. 16.
Figure 22:
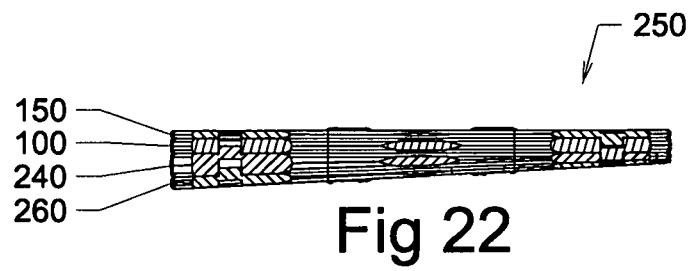
FIG. 22 is a section view through 22-22 of FIG. 21.
Figure 21:
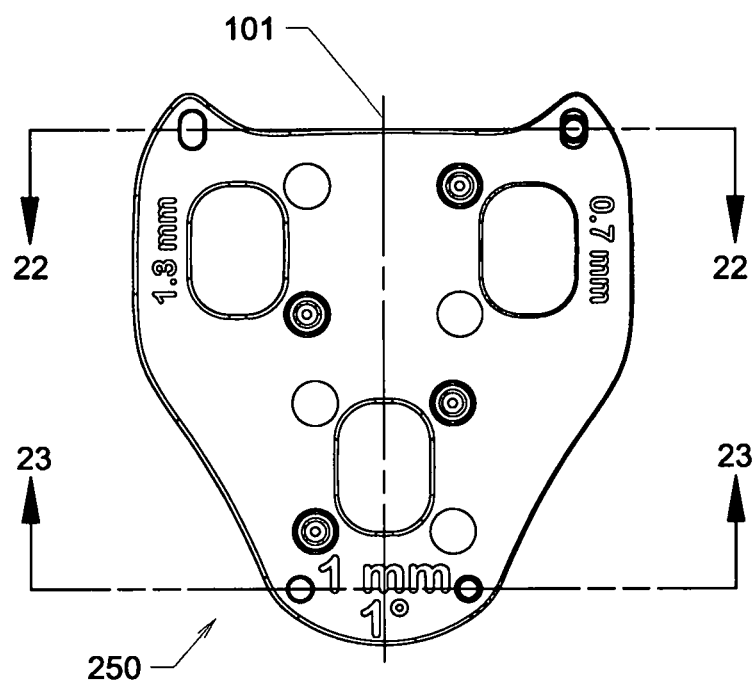
FIG. 21 is a plan view of a different stack of improved bicycle shoe to pedal cleat shims according to embodiments of the present.
Figure 23:
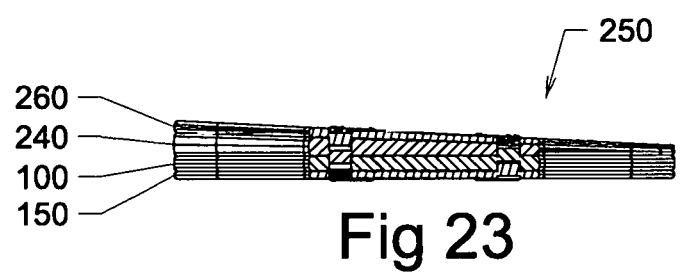
FIG. 23 is a section view through 23-23 of FIG. 21.
Figure 24:
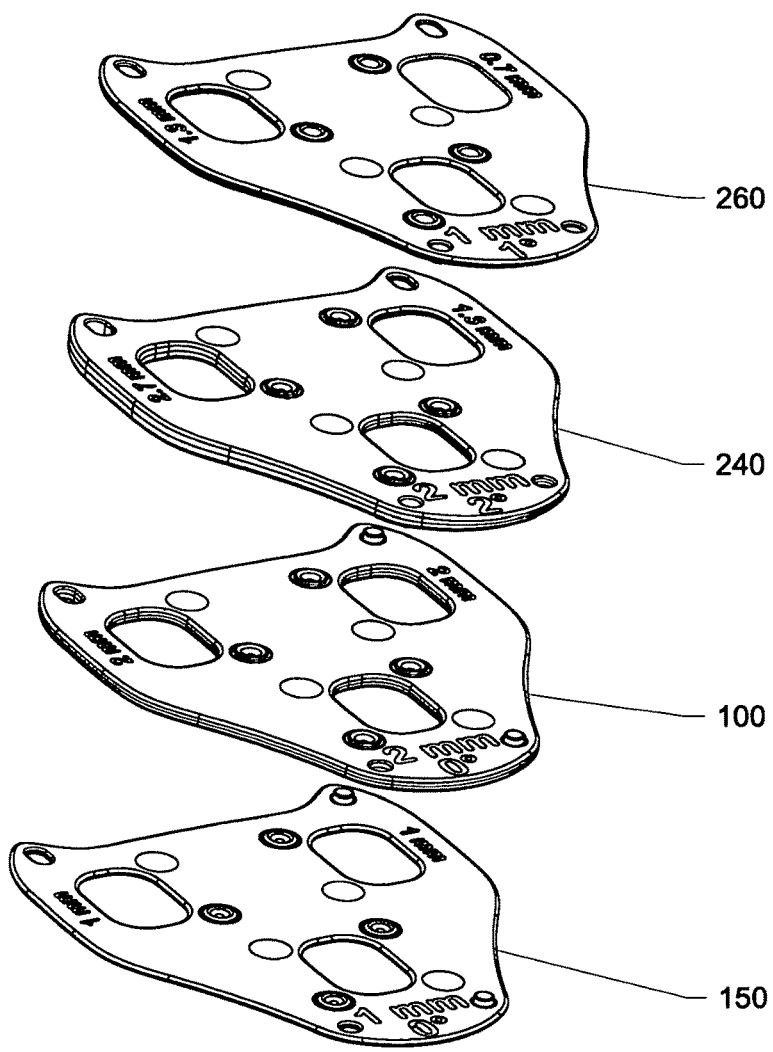
FIG. 24 is an exploded pictorial view of the stack in FIG. 21.
Figure 25:
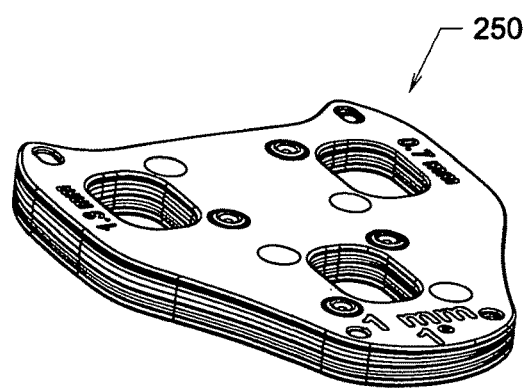
FIG. 25 is a pictorial view of the stack in FIG. 21.
Figure 27:
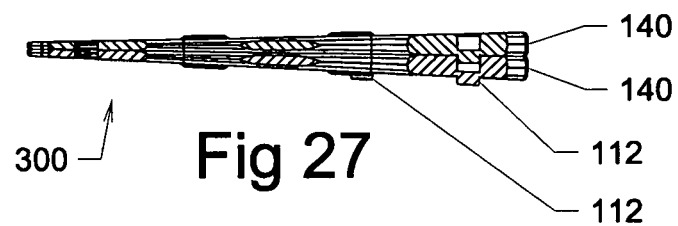
FIG. 27 is a section view through 27-27 of FIG. 26.
Figure 26:
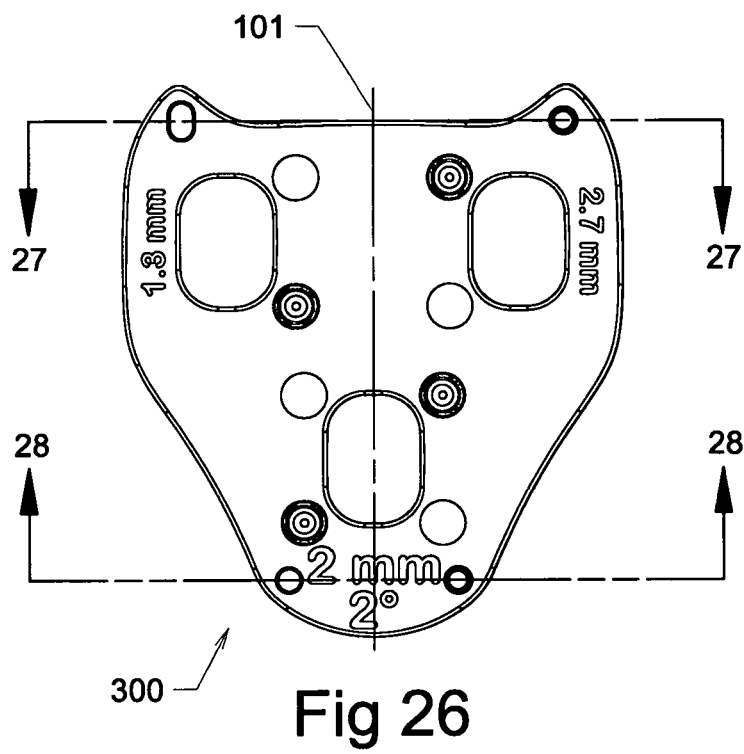
FIG. 26 is a plan view of another stack of improved bicycle shoe to pedal cleat shims according to embodiments of the present.
Figure 28:
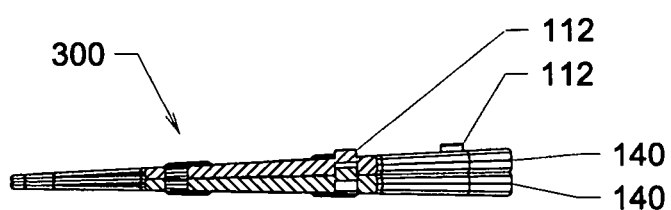
FIG. 28 is a section view through 28-28 of FIG. 26.
Figure 29:
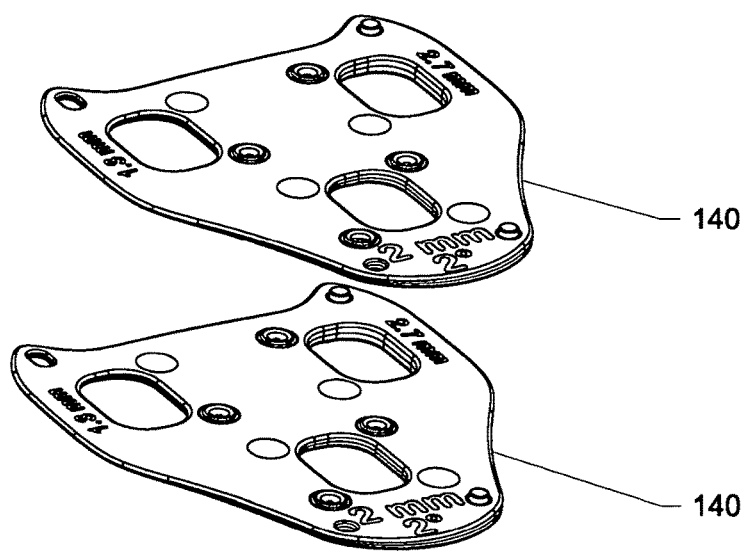
FIG. 29 is an exploded pictorial view of stack in FIG. 26.
Figure 30:
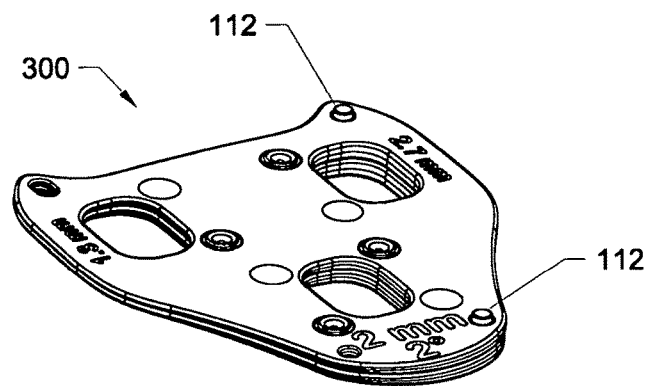
FIG. 30 is a pictorial view of the stack in FIG. 26.
Figure 32:
FIG. 32 is a section view through 32-32 of FIG. 31.
Figure 31:
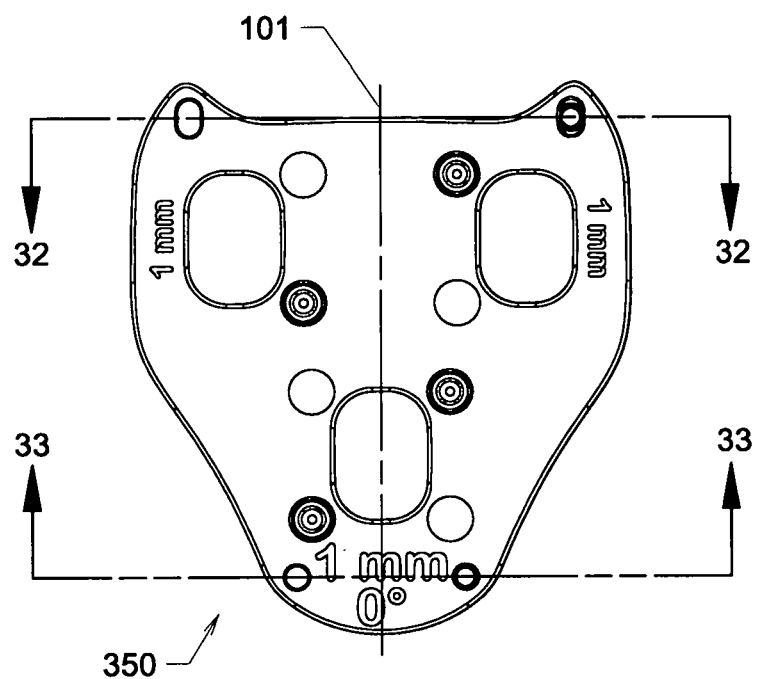
FIG. 31 is a plan view of a further stack of improved bicycle shoe to pedal cleat shims according to embodiments of the present.
Figure 33:
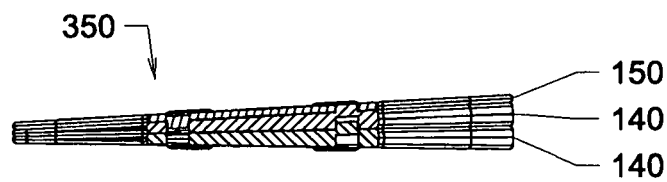
FIG. 33 is a section view through 33-33 of FIG. 31.
Figure 34:
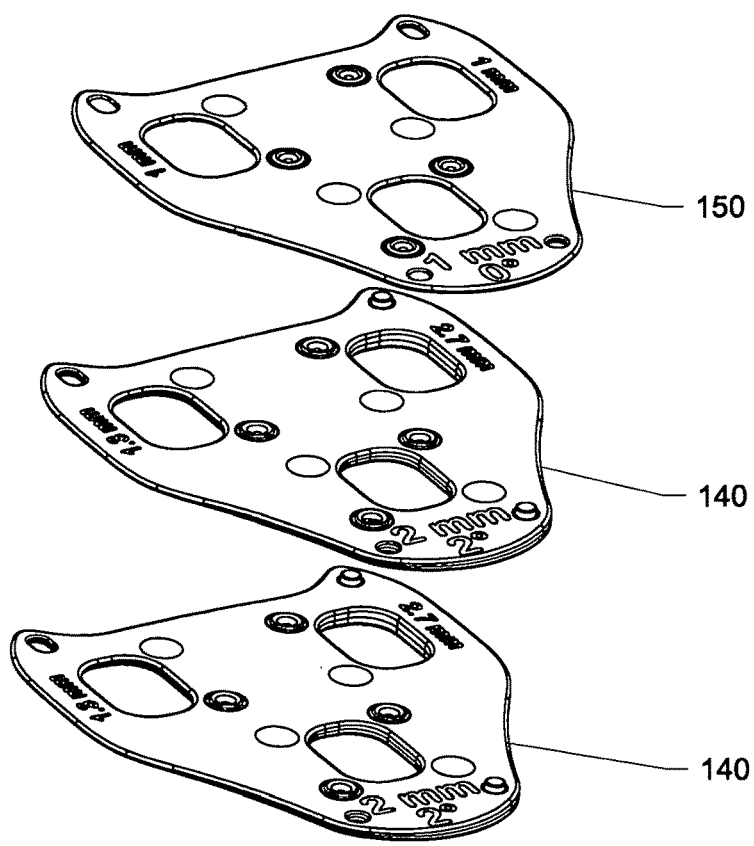
FIG. 34 is an exploded pictorial view of the stack in FIG. 31.
Figure 35:
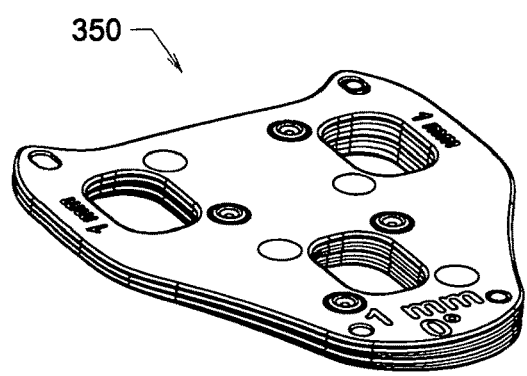
FIG. 35 is a pictorial view of the stack in FIG. 31.
Figure 36:
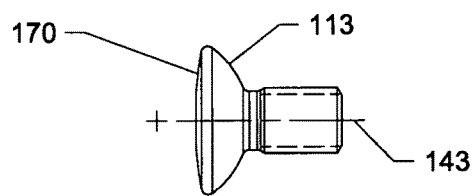
FIG. 36 is a side view of an embodiment of an improved bicycle shoe to pedal cleat mounting screw, with spherical seating face.
Figure 37:
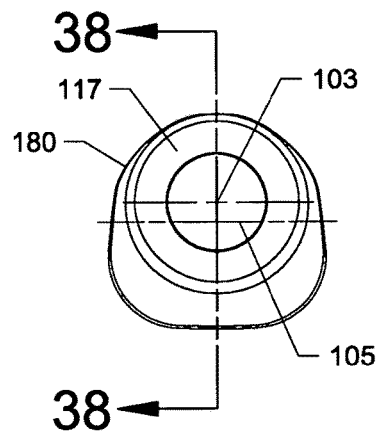
FIG. 37 is a plan view of an embodiment of an improved bicycle shoe to pedal cleat mounting washer, with spherical seating face.
Figure 38:
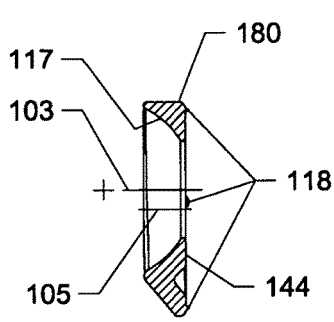
FIG. 38 is a section view of the washer of FIG. 37, with the section 38-38 passing through the centreline of the spherical seat.
Figure 39:
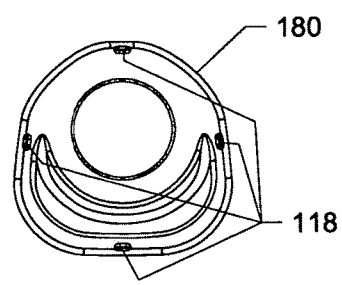
FIG. 39 is a back view of the washer of FIG. 37.
Figure 40:
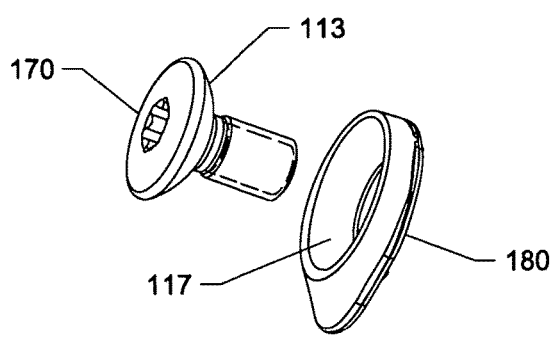
FIG. 40 is a pictorial view of the screw and washer prior to assembly.

FIGS. 16 to 20 show a 6 mm 3 Degree stack 200 of shims comprising of one 2 mm thick parallel shim 100, one 2 mm thick 2 degree angled shim 140, one 1 mm thick parallel shim 150 and one 1 mm thick 1 degree angled shim 160. The shim 150 is oriented in the stack (inverted) so that the stack 200 is arranged with the thickness increasing to the right and there are no pins protruding from the external faces 204 and 206 of the stack 200. FIG. 19 shows shim 150 is inverted due the pattern of pads 110 being on opposite sides of the centre line 101 than the pattern of pads on the other shims. In this way the pins of shim 150 (unseen on the underside) are inserted into sockets 114 and 115 of shim 100, and pins 112 of shim 100 are inserted into the sockets 214 and 215 of shim 150.

FIGS. 21 to 25 show a 6 mm 3 Degree stack 250 of shims comprising of one 2 mm thick parallel shim 100, one 2 mm thick 2 degree angled shim 240, one 1 mm thick parallel shim 150 and one 1 mm thick 1 degree angled shim 260. The stack is arranged with the thickness increasing to the left and no pins protruding. Shims 240 and 260 are inverted relative to the orientation of the other shims 100 and 150 as seen from the pattern of pads 110.

FIGS. 26 to 30 show a 4 mm 4 Degree stack 300 of shims comprising of two 2 mm thick 2 degree angled shims 140. The stack 300 is arranged with the thickness increasing to the right and pins 112 protruding. These pins 112 may need to be removed if they interfere with the shoe or cleat.

FIGS. 31 to 35 show a 5 mm 4 Degree stack 350 of shims comprising of two 2 mm thick 2 degree angled shims 140 and one 1 mm thick parallel shim 150. The stack is arranged with the thickness increasing to the right and no pins protruding. It can be seen shim 150 have been inverted relative to the other shims 140.

Referring to FIGS. 36 to 40 there is shown a screw 170 with a spherical seating mating face 113 and a washer 180 with a spherical seat mating face 117 thus allowing a washer seating face 144 to be out of square to a screw centreline 143. The preferred base material for the screw 170 is alloy steel however other materials can also be used. The preferred base material for the washer 180 is high carbon steel however other materials can also be used.

In an embodiment a centreline 103 of the spherical seat mating face 117 is offset to a washer centreline 105 allowing for the washer 180 to be turned thus increasing the positional options of the washer 180 in relation to a mating component, such as a slot, of the cleat.

In an embodiment the washer 180 has a number of protrusions 118 to bite into the mating component so the washer is less likely to slip. As the angle between the centreline of the screw 143 and the washer seating face 144 increases the chances of slip along the washer seating face 144 increases.

Figure 41:
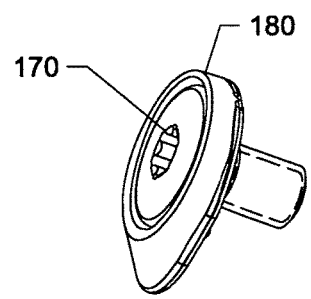
FIG. 41 is a pictorial view of the screw and washer assembled.
Figure 46:
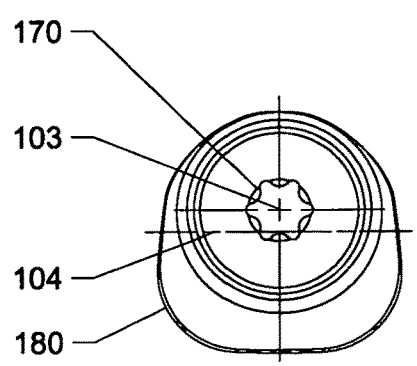
FIG. 46 is a plan view of the screw and washer assembled, with the washer being generally trapezoidal in shape.
Figure 47:
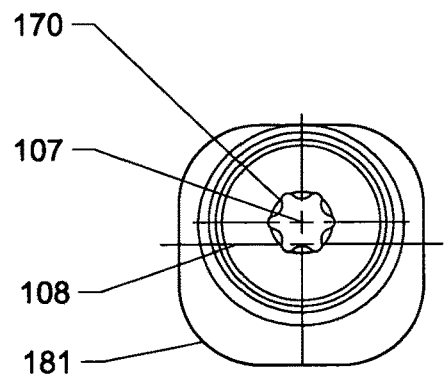
FIG. 47 is a plan view of the screw and washer assembled, with the washer being generally rectangular in shape.
Figure 48:
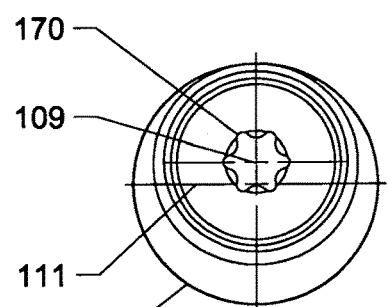
FIG. 48 is a plan view of the screw and washer assembled, with the washer being round in shape.
Figure 49:
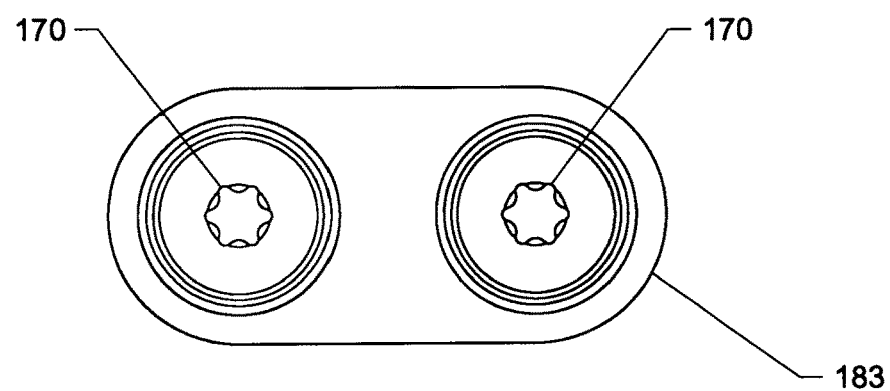
FIG. 49 is a plan view of two screws and washer/plate assembled, with the washer/plate having 2 screws pitched to match the pitch of the holes in a shoe.

FIG. 41 shows the assembly of the screw 170 with washer 180.

FIGS. 42 to 43 shows the assembly of the screw 170 with the washer 180 with the washer seating face 144 being square to the centreline of the screw 143.

FIGS. 44 to 45 show the assembly of screw 170 with washer 180 with the washer seating face 144 being 5 degrees off square to the centreline of the screw 143.

FIGS. 46 to 49 show the screw 170 assembled to various washer shapes shown as washers 180, 181, 182 and 183.

In an embodiment the washer 180 is generally trapezoidal in shape (its sides are trapezoidal, with rounded corners) giving the washer 180 more movement with only a small loss in the washer seating face 144 surface area. In an embodiment the centreline 103 of the washer spherical seat is offset to the washer centreline 104 allowing for the washer 180 to be turned thus increasing the positional options of the washer 180 in relation to the mating component.

In an embodiment the washer 181 is generally rectangular in shape (its sides are rectangular, with rounded corners) giving the washer 181 more seating face surface area but limiting movement. In an embodiment the centreline 107 of the washer spherical seat 144 is offset to the washer centreline 108 allowing for the washer to be turned thus increasing the positional options of the washer in relation to the mating component.

In an embodiment the washer 182 is round in shape giving the washer more movement without having to remove then turn the washer. This is the least desirable option as it has the least surface area between the washer and the mating component. In an embodiment the centreline 109 of the washer spherical seat is offset to the washer centreline 111 allowing for the washer to be turned thus increasing the positional options of the washer in relation to the mating component.

In an embodiment the washer 183 may be a plate having two or more spherical seats pitched to match the screw holes of the mating shoe to accommodate multiple screws 170.

Figure 50:
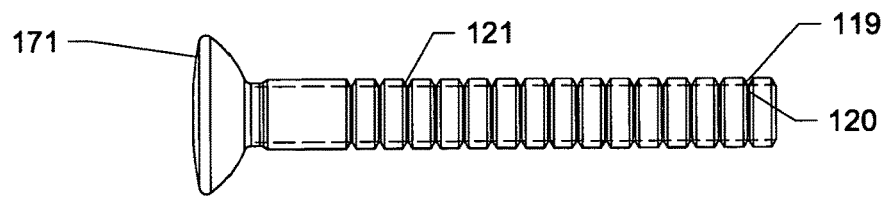
FIG. 50 is a side view of an embodiment of an improved bicycle shoe to pedal cleat mounting screw, with spherical seating face and grooves incrementally cut along the length of the screw.

FIG. 50 shows a screw 171 with a number of grooves 119 incrementally cut along the length of the thread thus creating marks for the screw to be cut to length whilst maintaining a clean thread start.

In an embodiment the groove faces 120 are coloured, preferably in a contrasting colour to the screw thus making them more visible.

Figure 51:
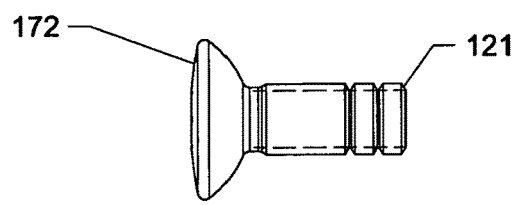
FIG. 51 is a side view of a screw of FIG. 50 after being cut at the third groove.

FIG. 51 shows a screw 172 which has been cut from screw 171. The cut is made immediately to the right of the third groove 121 centre so as to maintain a clean thread start.

Figure 53:
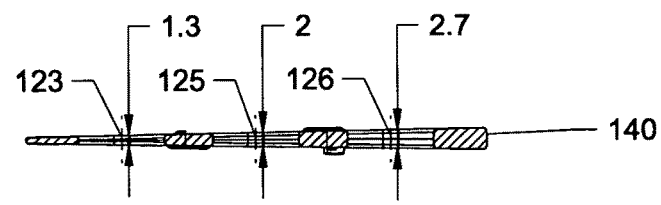
FIG. 53 is a section view of the shim of FIG. 52, with the section 53-53 passing through the centrelines of the screw relief pockets
Figure 52:
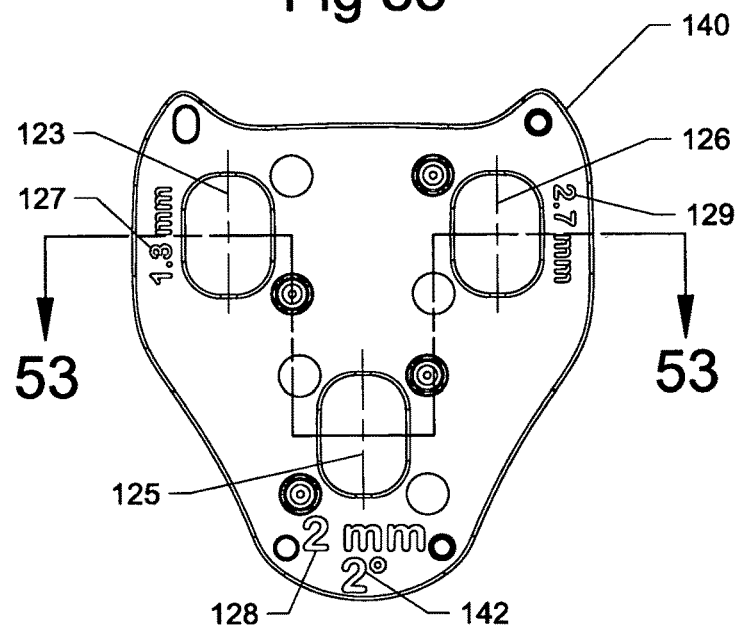
FIG. 52 is a plan view of an embodiment of an improved bicycle shoe to pedal cleat mounting shim, with thickness and angle marks.
Figures 55, 56, 57:
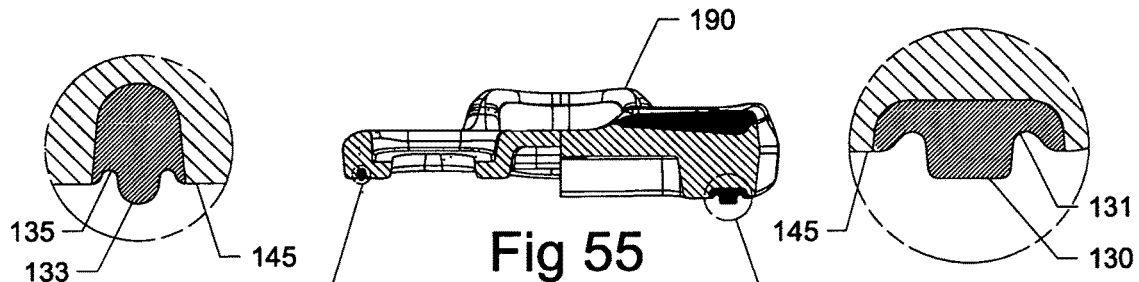
FIG. 55 is a section view of the cleat of FIG. 54, with the section 55-55 passing through a friction inducing pad and a dual use keying feature/friction inducing pad.
FIG. 56 is an enlarged detail '56' taken from section view FIG. 55.
FIG. 57 is an enlarged detail '57' taken from section view FIG. 55.
Figure 54:
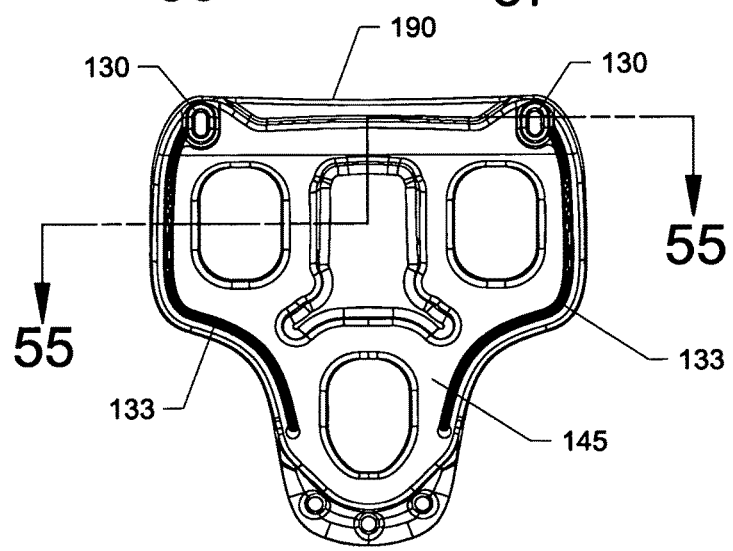
FIG. 54 is a plan view of an embodiment of an improved bicycle shoe to pedal cleat mounting cleat, showing the cleat to shoe/shim mating face.
Figure 58:
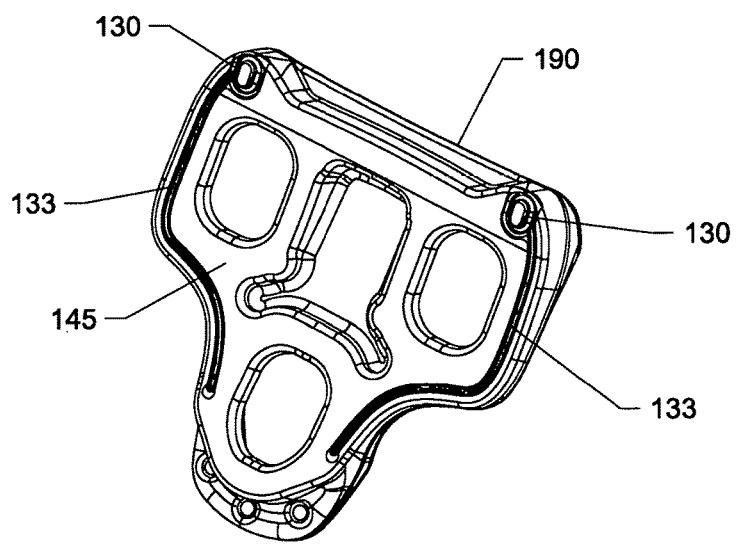
FIG. 58 is a pictorial view of the cleat, showing the cleat to shoe/shim mating face.

FIGS. 52 to 53 show a 2 mm thick 2 degree angled shim 140. The shim is marked with the average thickness of 1.3 mm 127 measured at the centreline 123 of the screw relief hole. The shim 140 is also marked with the average thickness of 2 mm 128 measured at the centreline 125 of the screw relief hole. The shim 140 is also marked with the average thickness of 2.7 mm 129 measured at the centreline 126 of the screw relief hole. The marks are adjacent to the screw relief pockets on the shim 140 so the length of screws required can be easily calculated.

In an embodiment the shim 140 is marked with the angle of 2° 142 for easy identification and so the total angle of the shim stack can be easily calculated.

FIGS. 54 to 58 show a bicycle shoe to pedal cleat 190 with the cleat to shoe/shim mating face 145 having one or more friction inducing pads 133 and 130 that comprises a pocket 135 and 131 to allow space for the friction material flow when the cleat is mated to the shoe, shim or another.

In an embodiment the friction inducing pads 133 and 130 are formed of a thermoplastic elastomer.

In another aspect of the improved bicycle shoe to pedal cleat 190 the cleat to shoe/shim mating face 145 has two or more cleat to shim keying features 130.

In an embodiment the keying features comprise two or more pins 130.

In an embodiment the keying feature 130 is dual use being made from rubber-like material to create friction inducing pads/pins 130. Each pad/pin is readily removable.

In an embodiment the friction inducing pads 130 comprise a pocket 131 to allow space for the friction material flow when the cleat is mated to the shoe, shim or another.

In an embodiment each pad/pin 130 is susceptible to removable by application of a cutting force substantially parallel to the mating face 145.

In an embodiment the dual use keying feature/friction inducing pads 130 are formed of a thermoplastic elastomer.

Figure 59:
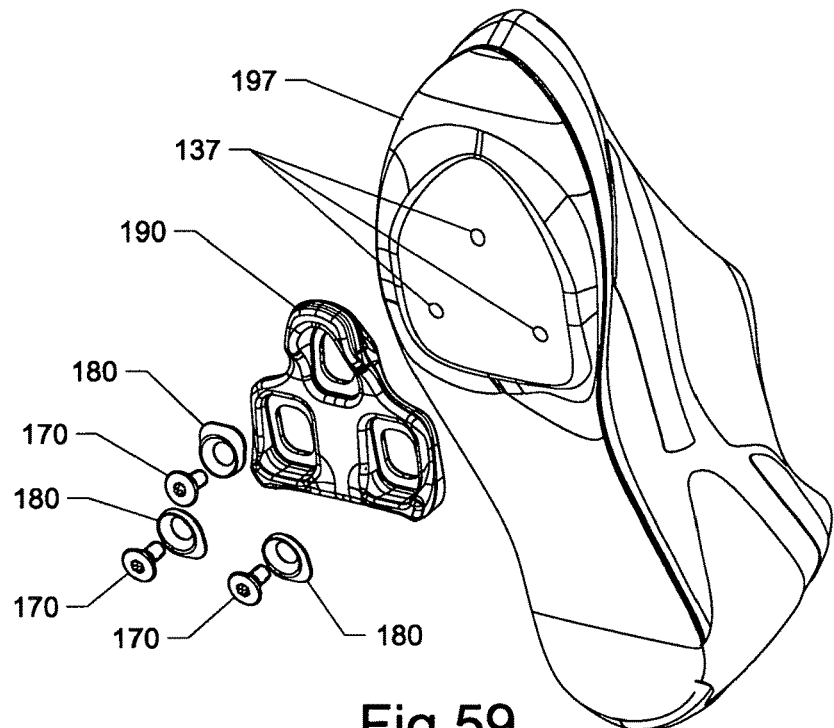
FIG. 59 is a pictorial view of the improved bicycle shoe to pedal cleat mounting prior to assembly.
Figure 60:
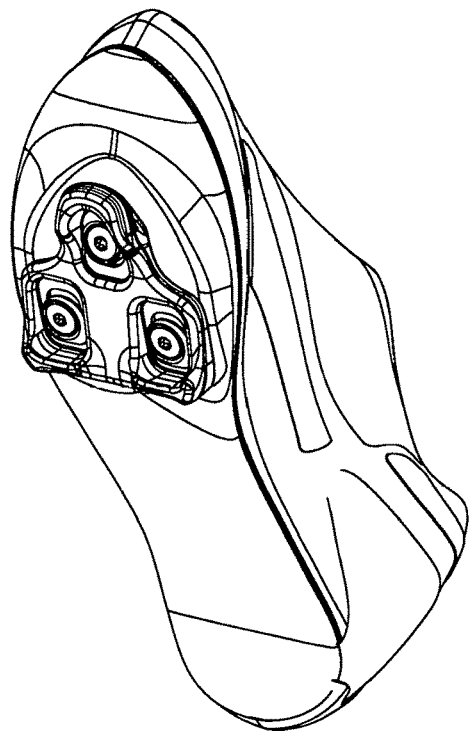
FIG. 60 is a pictorial view of the improved bicycle shoe to pedal cleat mounting assembled.
Figure 63:
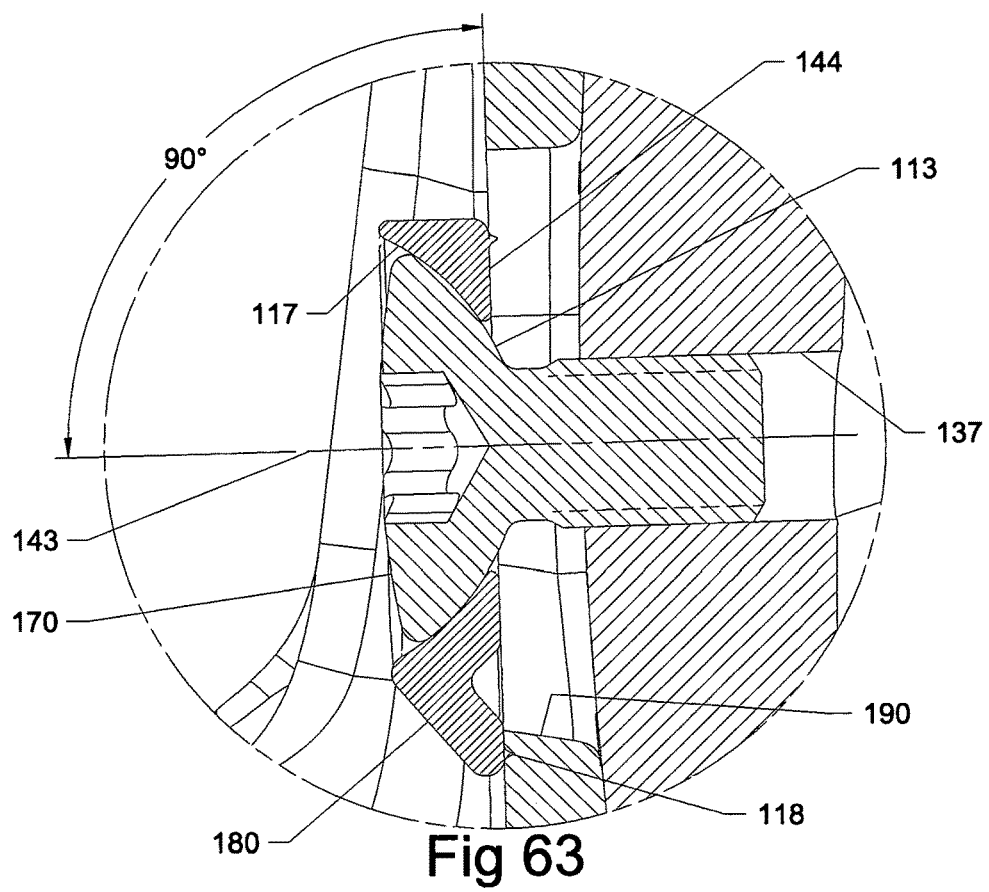
FIG. 63 is an enlarged detail '63' taken from section view FIG. 62.
Figure 64:
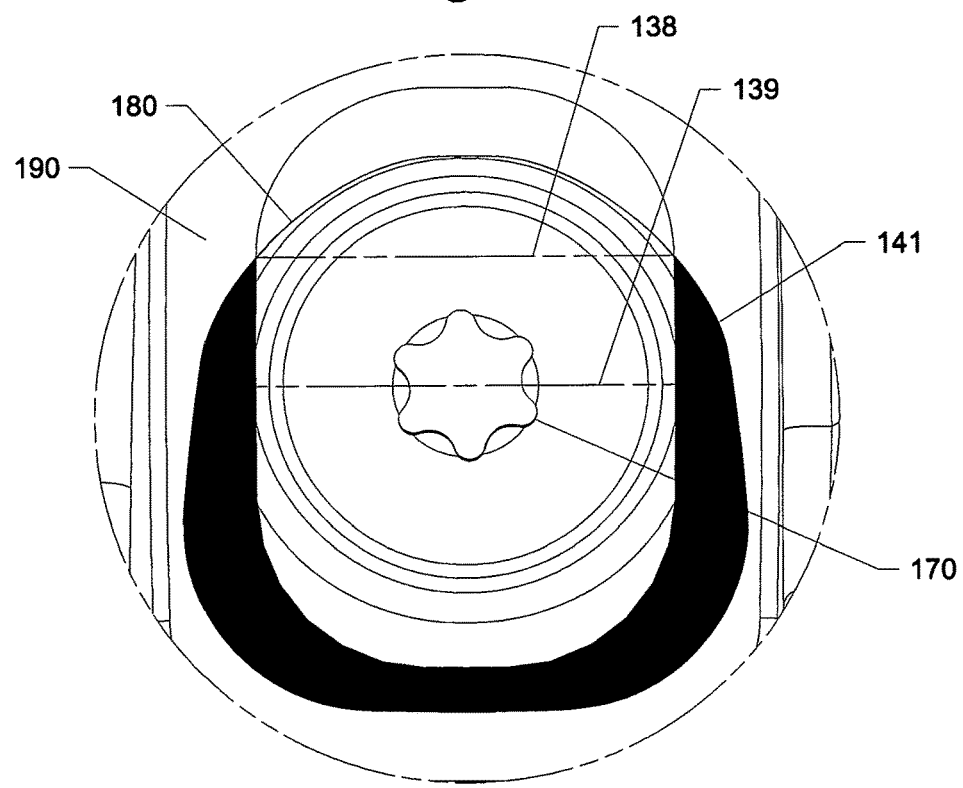
FIG. 64 is an enlarged detail '64' taken from plan view FIG. 61.

FIGS. 59 to 60 show the improved bicycle shoe to pedal cleat mounting assembly consisting of a three hole 137 bike shoe 197 and a bike shoe cleat 190 and three spherical seat washers 180 and 3 spherical seat screws 170.

FIGS. 61 to 64 show the improved bicycle shoe to pedal cleat mounting assembly consisting of a three hole 137 bike shoe 197 and a bike shoe cleat 190, and three spherical seat washers 180 and three spherical seat screws 170 with the cleat 190 positioned centrally. The centreline 143 of the screw 170 is square to the washer 180 seating face 144. The washer 180 protrusions 118 are biting into the mating component in the form of a slot in the cleat body 190 so the washer is less likely to slip. The mating surface area 141 between the washer 180 and cleat 190 has seating face centre of load 139. Either side of the centre of load centreline 139 the force on the face will be about equal. The further seating face 138 extends from the centre of load 139 and the greater the surface area 141, the less creep will occur in the cleat body from the load applied. If the material of the cleat body is not able to support the load, then a rectangular washer may be required to increase the loaded surface area with the disadvantage of limiting the adjustment of the cleat position.

Figure 65:
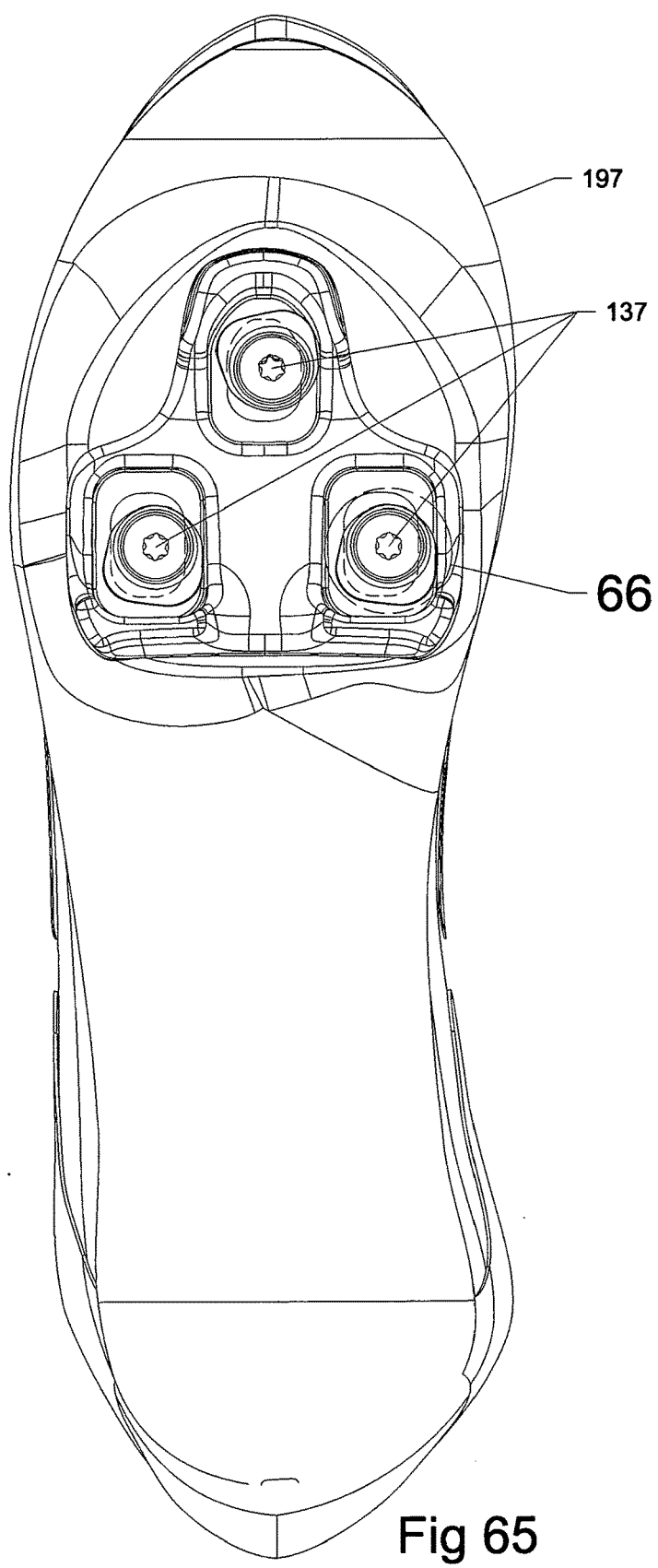
FIG. 65 is a plan view of the improved bicycle shoe to pedal cleat mounting assembled, showing the bottom face of the shoe with the cleat positioned left of centre.
Figure 66:
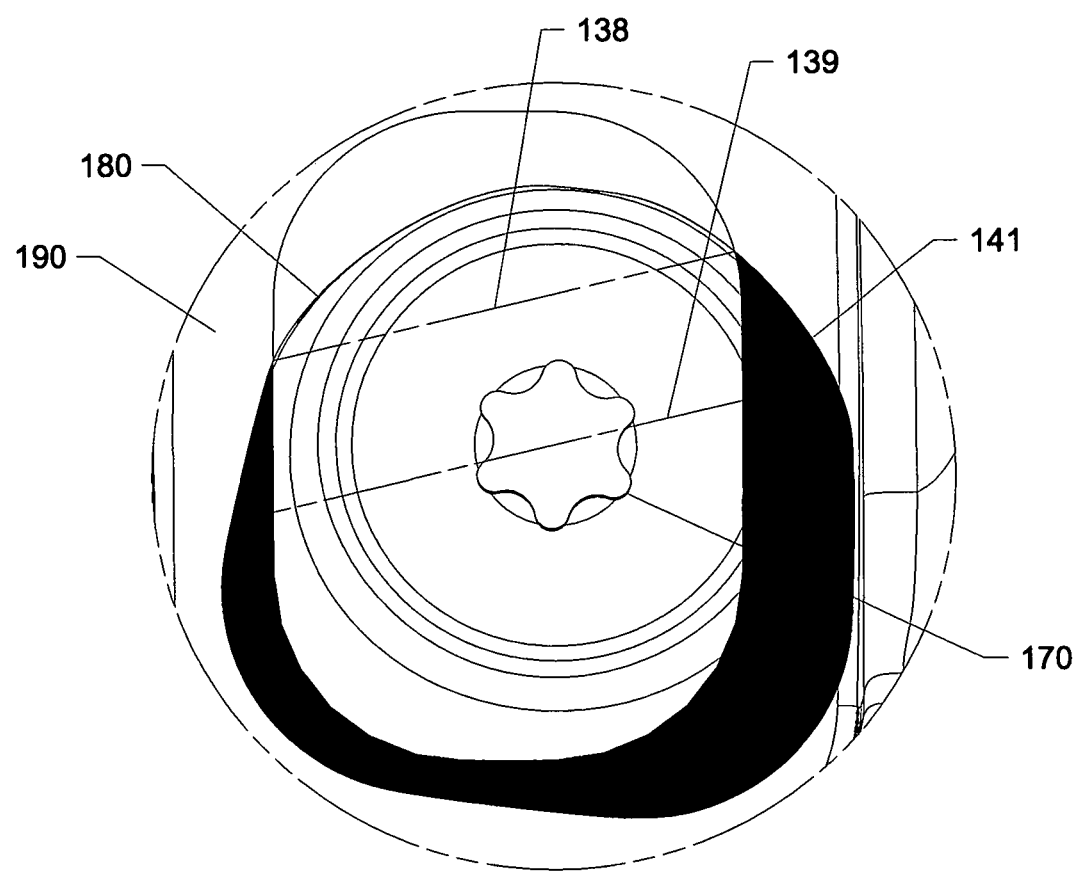
FIG. 66 is an enlarged detail '66' taken from plan view FIG. 65.

FIGS. 65 to 66 show the improved bicycle shoe to pedal cleat mounting assembly consisting of a three hole 137 bike shoe 197 and a bike shoe cleat 190, and three spherical seat washers 180 and three spherical seat screws 170 with the cleat 190 positioned left of centre. The mating surface area 141 between the washer 180 and cleat 190 has seating face centre of load 139. Either side of the centre of load centreline 139 the force on the face will be about equal.

Figure 67:
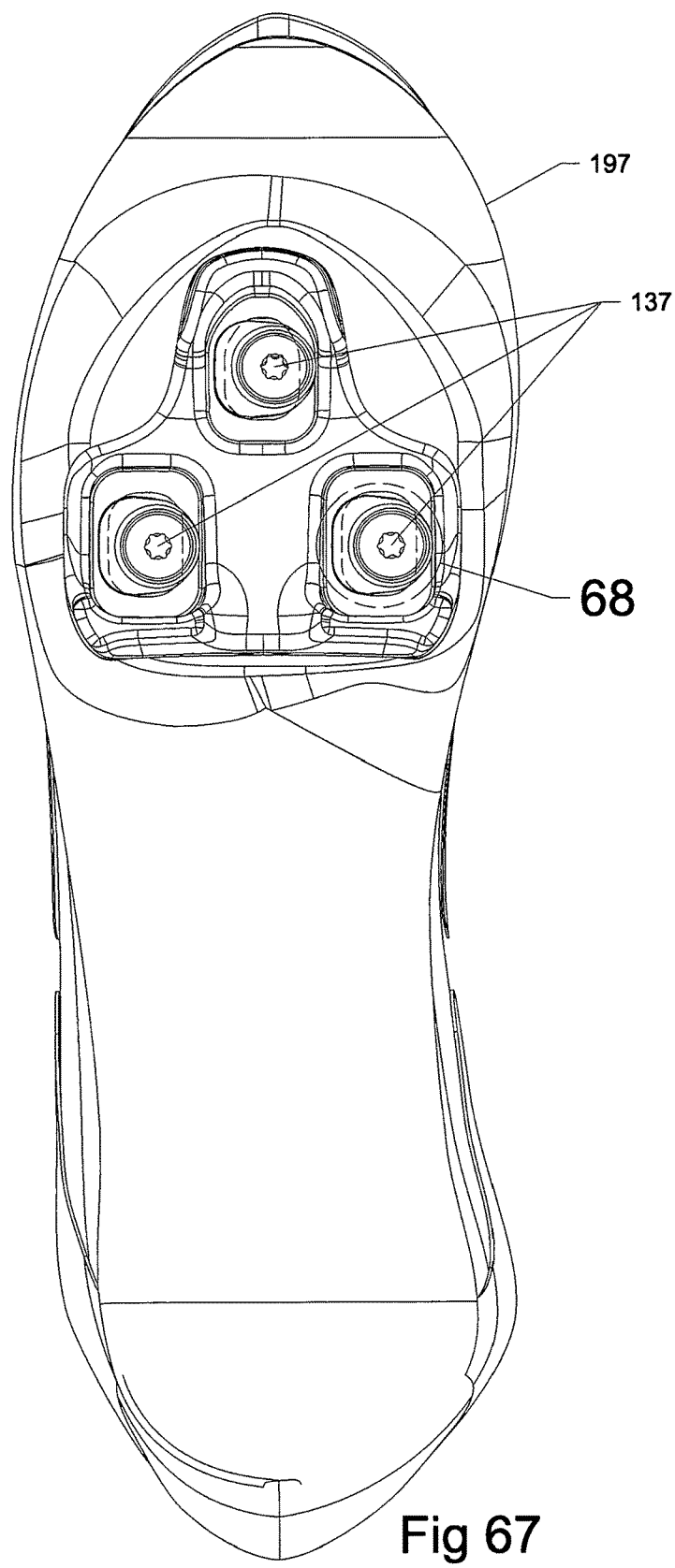
FIG. 67 is a plan view of the improved bicycle shoe to pedal cleat mounting assembled, showing the bottom face of the shoe with the cleat positioned fully left and washers turned 90 degrees.
Figure 68:
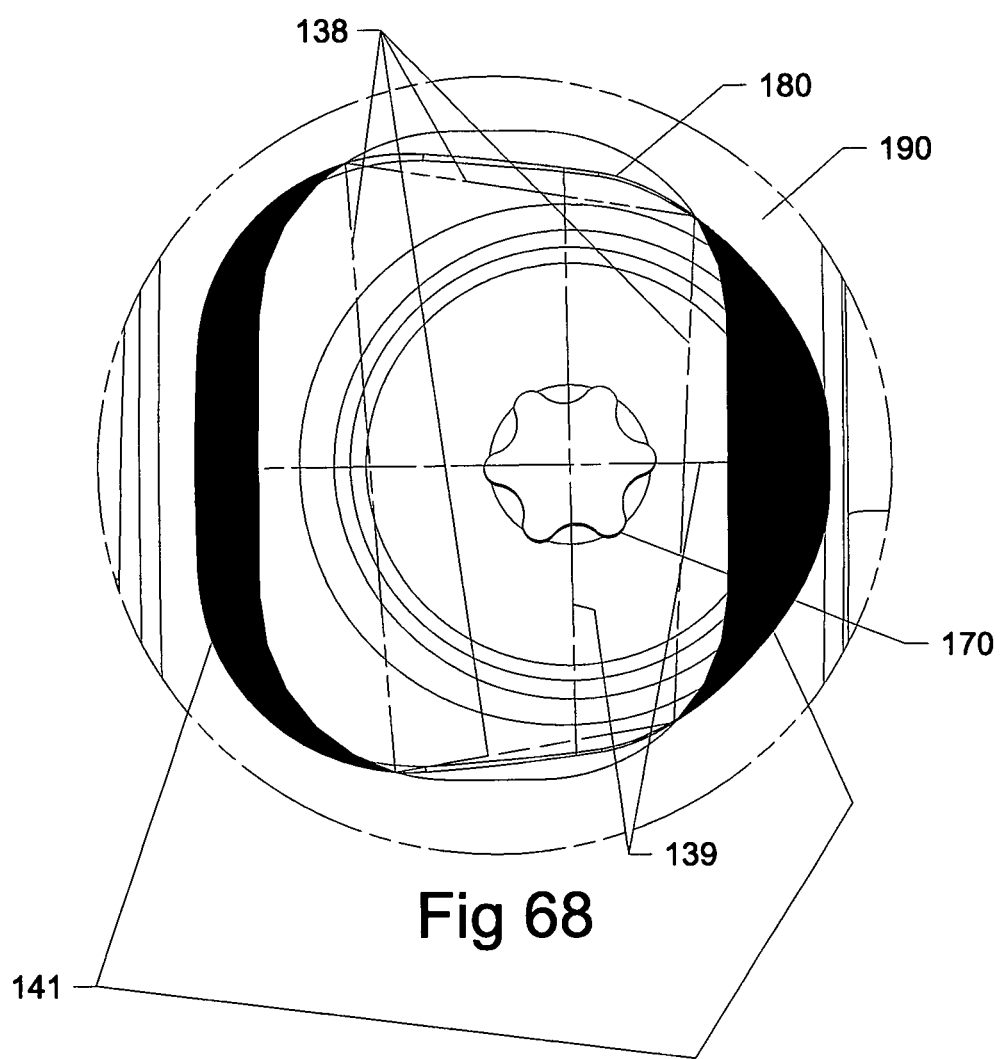
FIG. 68 is an enlarged detail '68' taken from plan view FIG. 67.
Figures 69, 70:
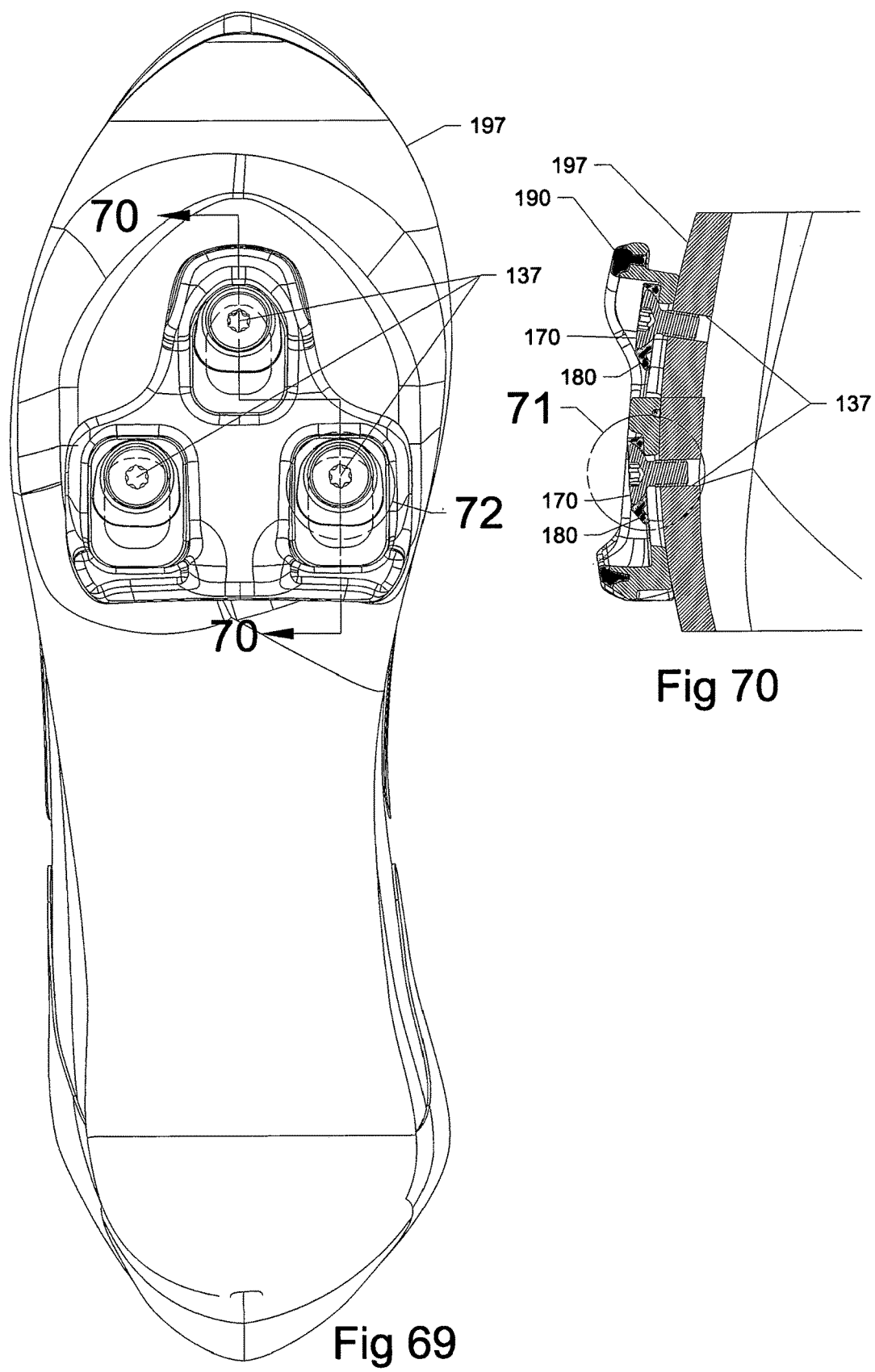
FIG. 69 is a plan view of the improved bicycle shoe to pedal cleat mounting assembled, showing the bottom face of the shoe with the cleat positioned fully back.
FIG. 70 is a section view of the assembly of FIG. 69, with the section 70-70 passing through the centreline of the screw holes.
Figure 71:
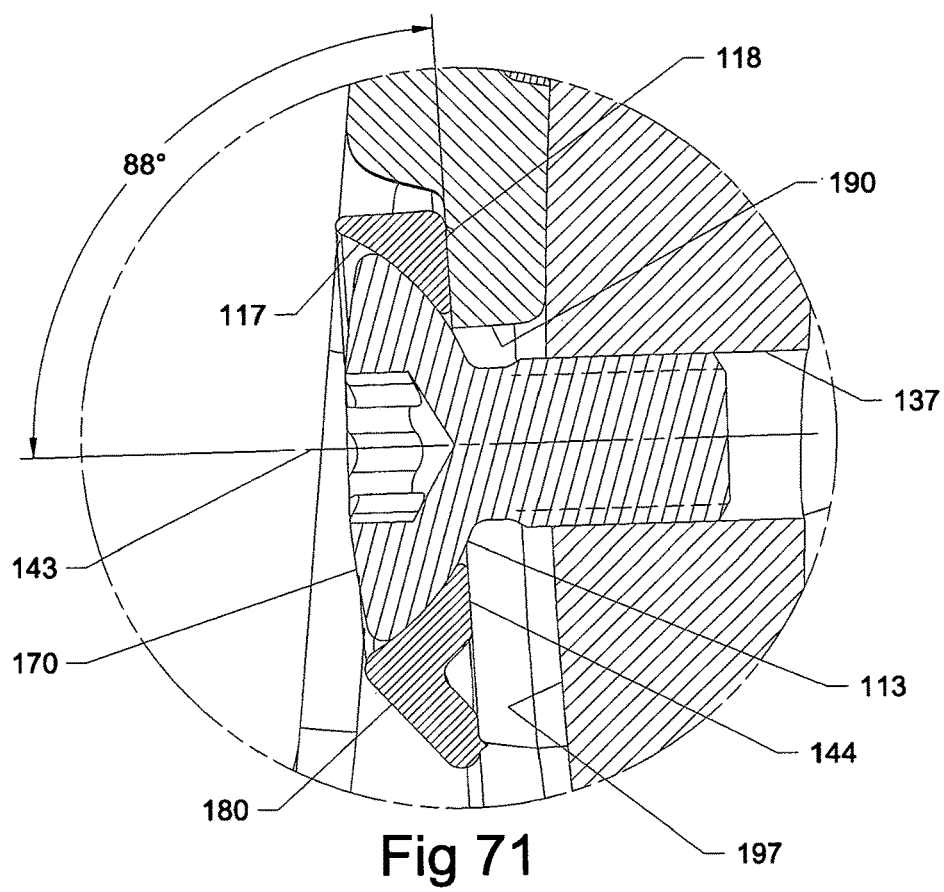
FIG. 71 is an enlarged detail '71' taken from section view FIG. 70.
Figure 72:
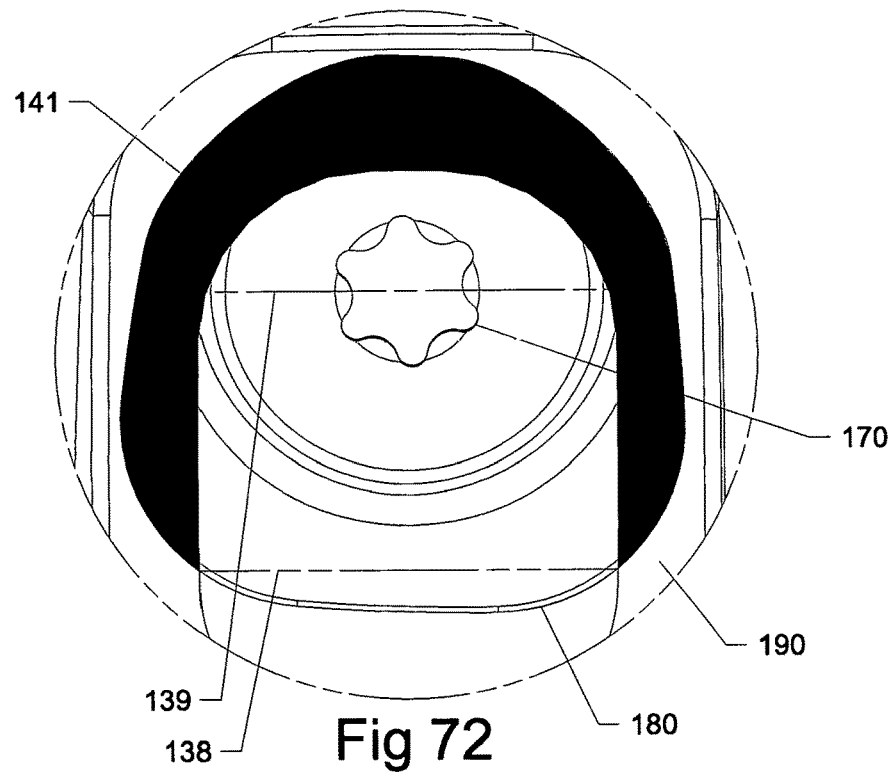
FIG. 72 is an enlarged detail '72' taken from plan view FIG. 69.

FIGS. 67 to 68 show the improved bicycle shoe to pedal cleat mounting assembly consisting of a three hole 137 bike shoe 197 and a bike shoe cleat 190, and three spherical seat washers 180 and three spherical seat screws 170 with the cleat 190 positioned fully left and washers turned 90 degrees.

FIGS. 69 to 72 show the improved bicycle shoe to pedal cleat mounting assembly consisting of a three hole 137 bike shoe 197 and a bike shoe cleat 190, and three spherical seat washers 180 and three spherical seat screws 170 with the cleat positioned fully back. The centreline 143 of the screw 170 is 2 degrees off square to the washer 180 seating face 144. The washer 180 protrusions 118 are biting into the cleat body 190 so the washer is less likely to slip.

Figure 73:
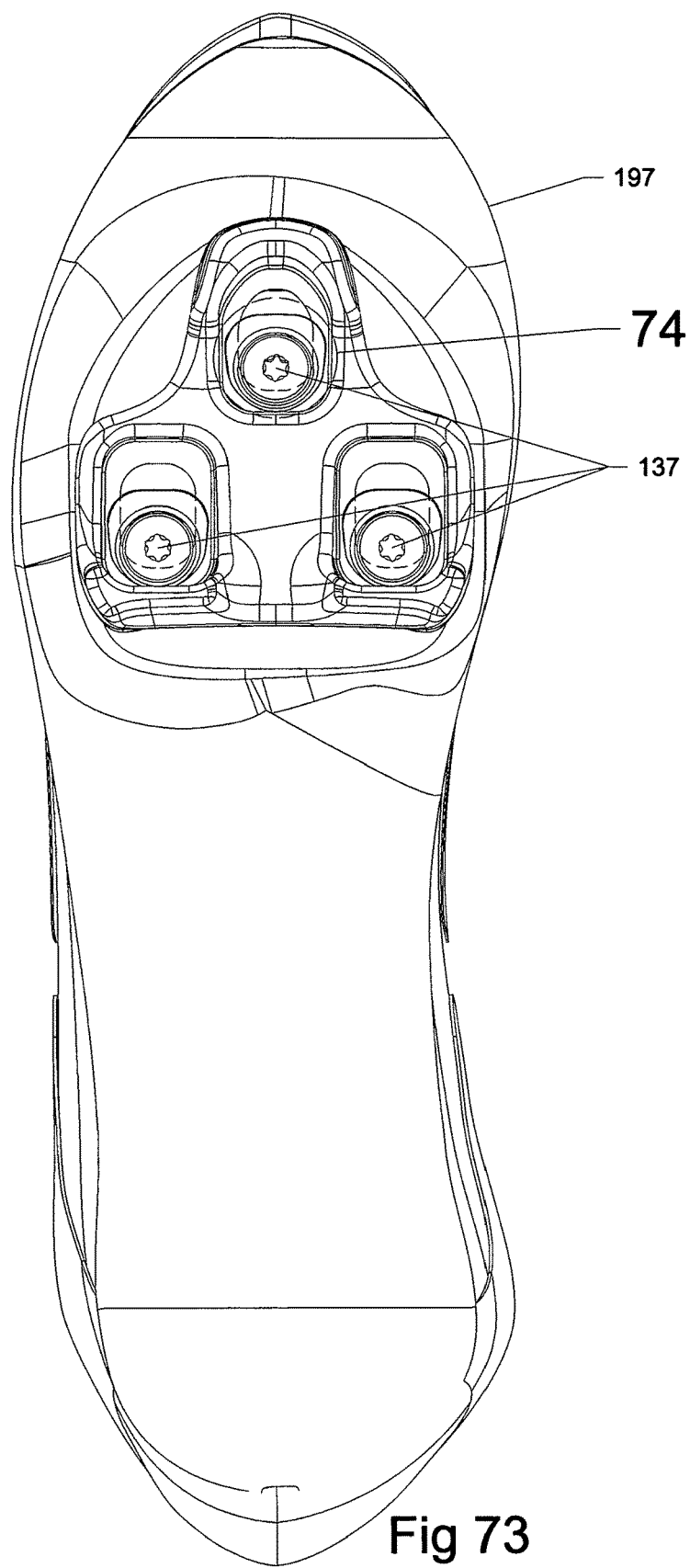
FIG. 73 is a plan view of the improved bicycle shoe to pedal cleat mounting assembled, showing the bottom face of the shoe with the cleat positioned fully forward.
Figure 74:
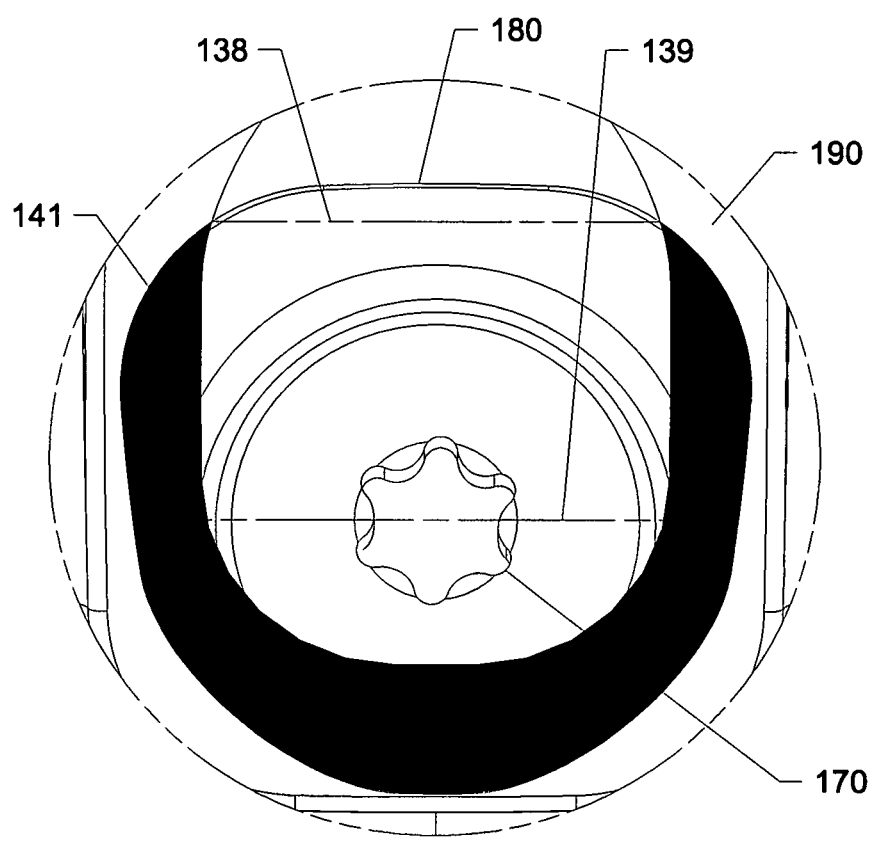
FIG. 74 is an enlarged detail '74' taken from plan view FIG. 73.

FIGS. 73 to 74 show the improved bicycle shoe to pedal cleat mounting assembly consisting of a three hole 137 bike shoe 197 and a bike shoe cleat 190, and three spherical seat washers 180 and three spherical seat screws 170 with the cleat positioned fully forward.

Figure 75:
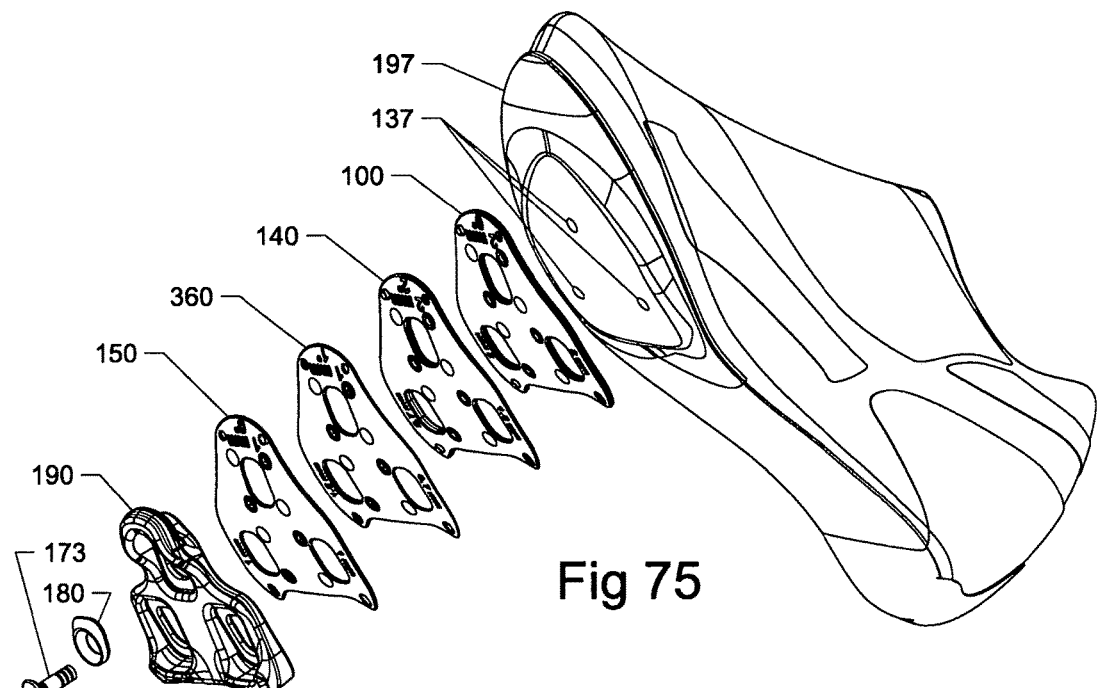
FIG. 75 is a pictorial view of the improved bicycle shoe to pedal cleat mounting with shim stack prior to assembly.
Figure 76:
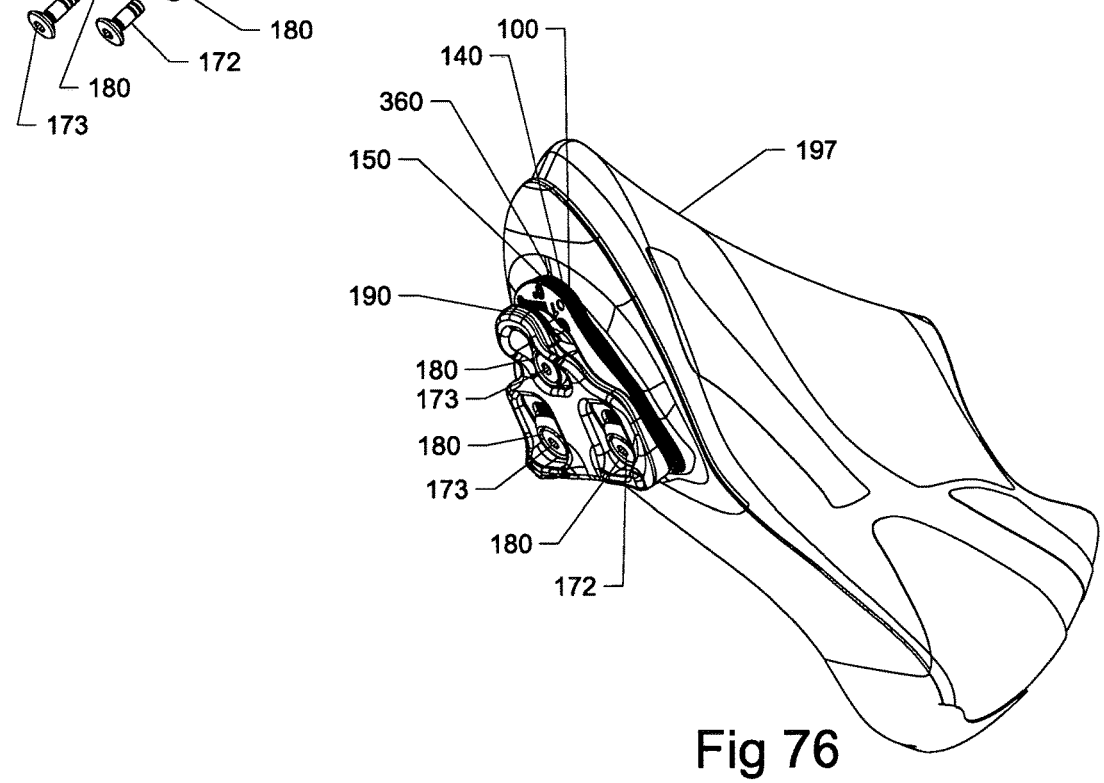
FIG. 76 is a pictorial view of the improved bicycle shoe to pedal cleat mounting with shim stack assembled.
Figures 77, 78:
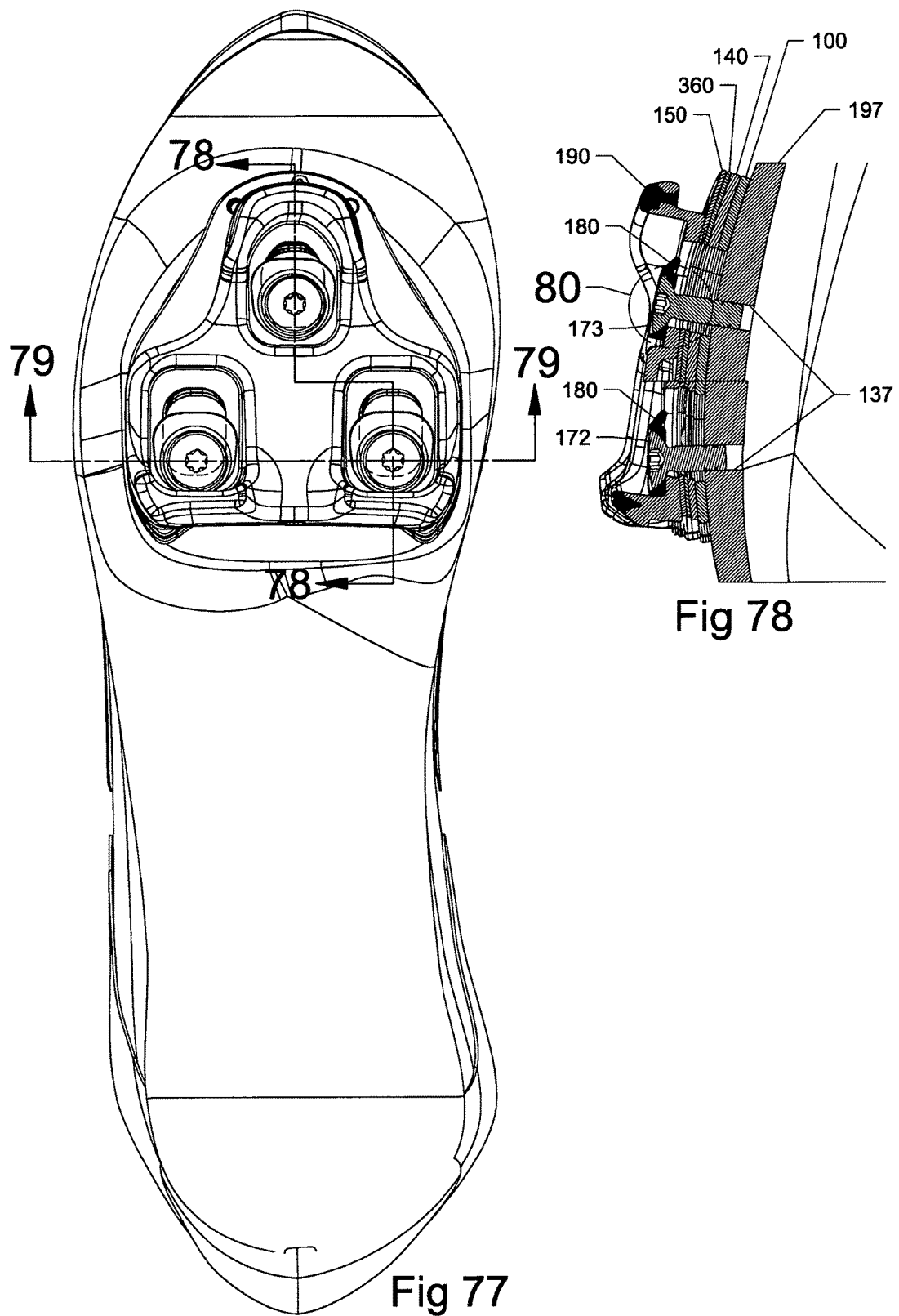
FIG. 77 is a plan view of the improved bicycle shoe to pedal cleat mounting with shim stack assembled, showing the bottom face of the shoe with the cleat positioned fully forward.
FIG. 78 is a section view of the assembly of FIG. 77, with the section 78-78 passing through the centreline of the screw holes parallel to the heal toe centreline of the shoe.
Figure 79:
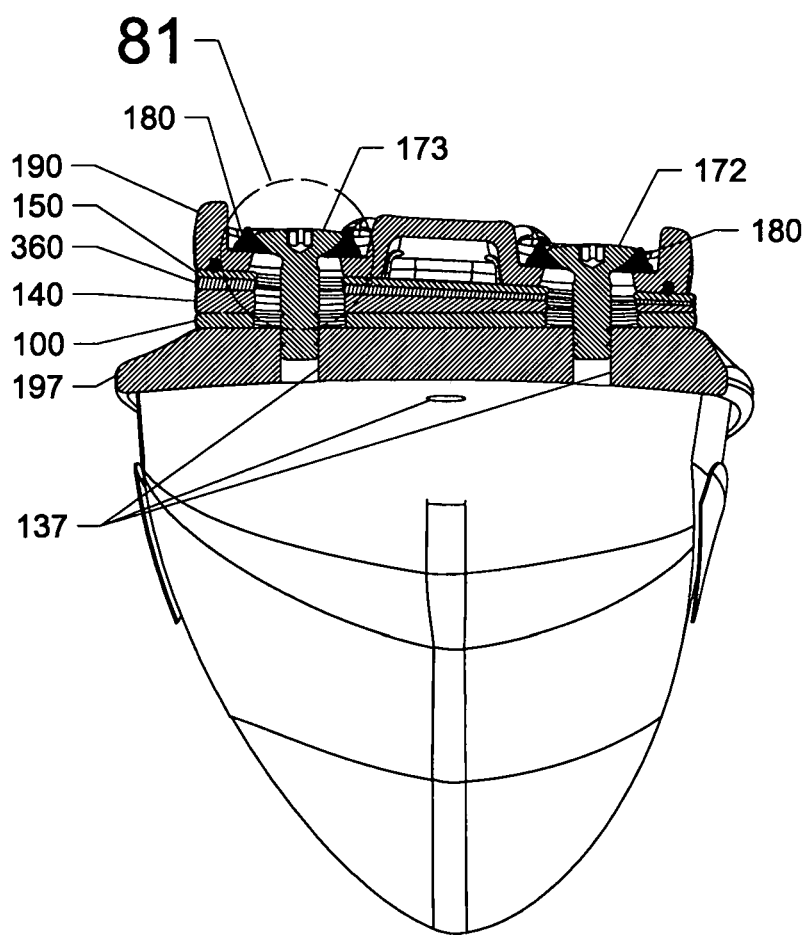
FIG. 79 is a section view of the assembly of FIG. 77, with the section 79-79 passing through the centreline of the screw holes perpendicular to the heal toe centreline of the shoe.
Figure 80:
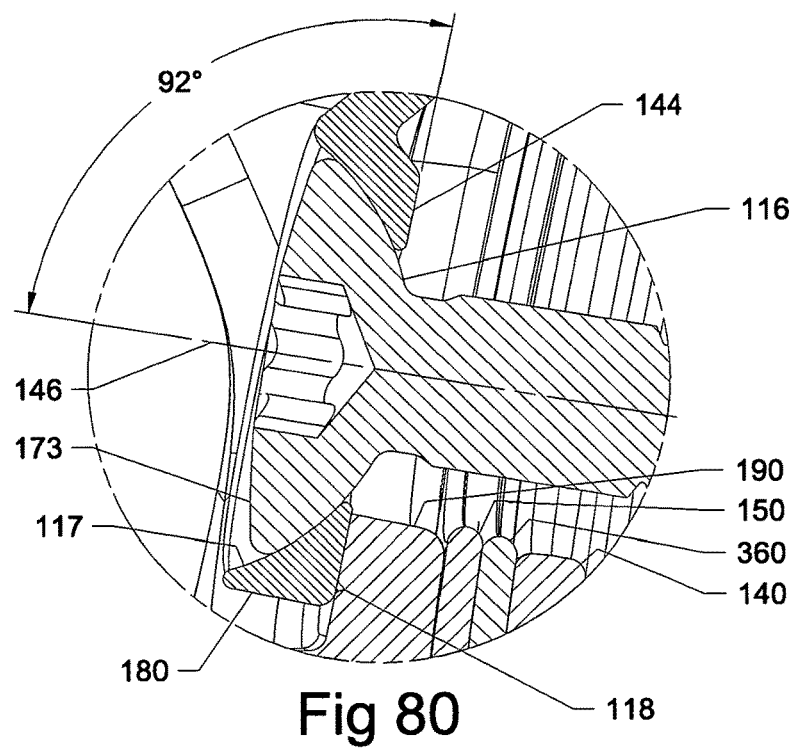
FIG. 80 is an enlarged detail '80' taken from section view FIG. 78.
Figure 81:
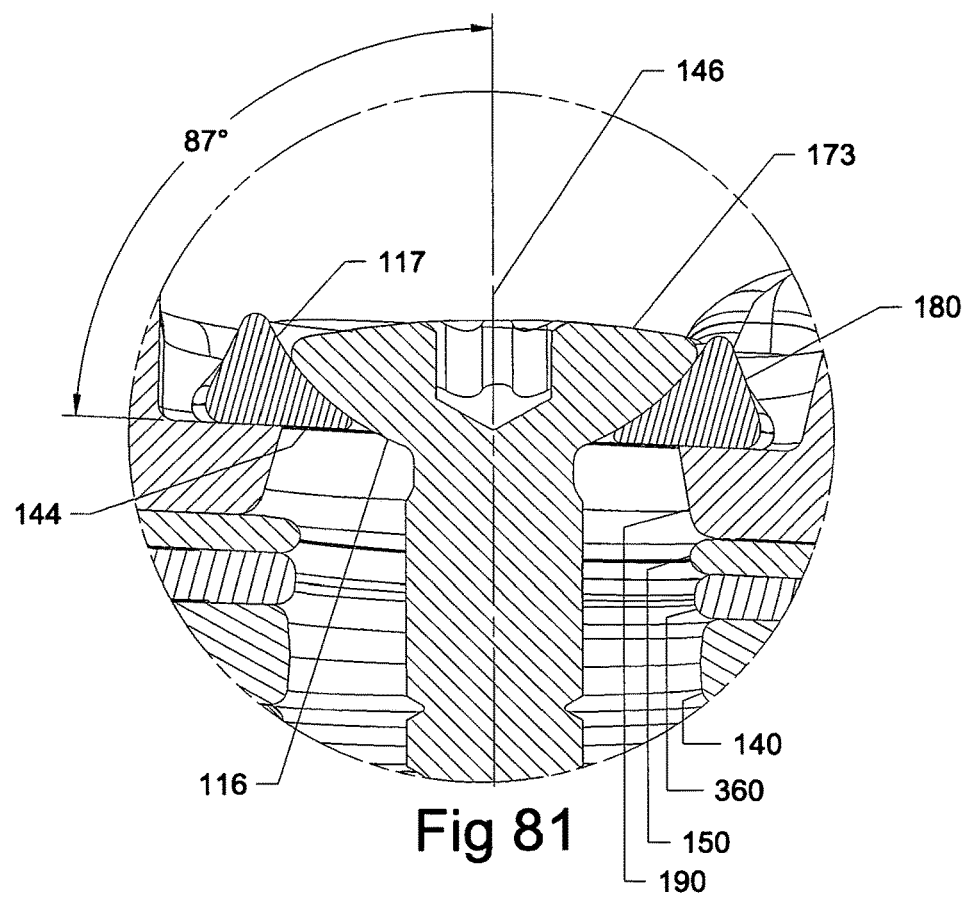
FIG. 81 is an enlarged detail '81' taken from section view FIG. 79.

FIGS. 75 to 76 show the improved bicycle shoe to pedal cleat mounting assembly consisting of a three hole 137 bike shoe 197, a 2 mm thick parallel shim 100 with keying pins facing away from the shoe, a 2 mm thick 2 degree angled shim 140 with keying pins facing away from the shoe, a 1 mm thick 1 degree angled shim with keying pins removed 360 and a 1 mm thick parallel shim 150 with keying pins facing towards the shoe, a bike shoe cleat 190, and three spherical seat washers 180, 2 spherical seat screws 173 and 1 spherical seat screws 172.

FIGS. 77 to 81 show the improved bicycle shoe to pedal cleat mounting assembly consisting of a three hole 137 bike shoe 197, a 2 mm thick parallel shim 100 with keying pins facing away from the shoe, a 2 mm thick 2 degree angled shim 140 with keying pins facing away from the shoe, a 1 mm thick 1 degree angled shim with keying pins removed 360 and a 1 mm thick parallel shim 150 with keying pins facing towards the shoe, a bike shoe cleat 190, and three spherical seat washers 180, two spherical seat screws 173 and one spherical seat screws 172. In the shoe 197 heal to toe direction the centreline 146 of the Screw 173 is 2 Degrees off square to the washer 180 seating face 144. Square to the shoe 197 heal to toe direction the centreline 146 of the screw 173 is 3 degrees off square to the washer 180 seating face 144. The washer 180 protrusions 118 are biting into the cleat body 190 so the washer is less likely to slip.

Modifications may be made to the present invention within the context of that described and shown in the drawings. Such modifications are intended to form part of the invention described in this specification.

The invention claimed is:

1. An improved bicycle shoe to pedal cleat first shim comprising a shim body with mating faces on opposite sides of the shim body, each for mating with another surface, each mating face having a plurality of shim-to-shim-keying-features, wherein the shim-to-shim-keying-features comprise two or more pins offset to the same side of a heel to toe centreline of the first shim on one of the mating faces, wherein the shim-to-shim-keying-features comprise two or more sockets on the other mating face for receiving pins of a second shim, wherein the sockets are to the same side of the heel to toe centreline as the pins of the first shim.

2. A first shim according to claim 1, wherein the mating faces are either parallel or angled with respect to each other.

3. A first shim according to claim 1, wherein an other surface is capable of mating with each of: a pedal cleat, a bicycle shoe, and another mating surface of the second shim.

4. A first shim according to claim 1, wherein the mounting faces further comprise one or more friction inducing pads.

5. A first shim according to claim 4, wherein the mounting faces further comprise a non-slip texture on a remaining surface portion of the mating faces.

6. A first shim according to claim 4, wherein each friction inducing pad comprises a protrusion above the mating faces.

7. A first shim according to claim 6, wherein each friction inducing pad comprises a pocket to allow space for a friction material to flow when the shim is mated to the bicycle shoe, pedal cleat or the second shim.

8. A first shim according to claim 1, wherein each of the sockets is one of: a socket through the first shim, back to back sockets or a socket on the other side of one of the pins.

9. A first shim according to claim 1, wherein each pin of the first shim is on the same side of the heel to toe centre line, the first shim is stackable on the second shim, and pins of the second shim are able to be received in the sockets.

10. A first shim according to claim 1, wherein the first shim is stackable with the second shim, wherein each pin of the first shim is on the opposite side of pins of the second shim and the pins of the second shim are able to be received in the sockets.

11. A first shim according to claim 1, wherein each pin of the first shim is positioned in line with a corresponding one of the sockets of the other mating face on the same side of the centreline of the first shim and is connected to the shim body by a narrowed section of material parallel to the mating face.

12. A first shim according to claim 11, wherein each pin is removable by breaking the narrowed section of material.

13. A mounting assembly for mounting a bicycle shoe to pedal cleat, comprising a screw with a convex curved seating face and a washer with a substantially matching mating concave curved seating face, and the improved bicycle shoe to pedal cleat shim according to claim 1.

14. A mounting assembly according to claim 13, wherein a centreline of the concave curved seating face of the washer is offset to a washer centreline, allowing for the washer to be turned in a slot of the cleat permitting greater movement of the cleat whilst maintaining surface area between the washer and a cleat body, and keeping the load force over the centre point of a washer to screw interface.

15. An improved bicycle shoe to pedal cleat mounting cleat comprising a cleat body with a cleat to shim mating face having two or more cleat to shim keying features comprising two or more pins, and the improved bicycle shoe to pedal cleat shim according to claim 1.

16. A mounting cleat according to claim 15, wherein the keying features of the bicycle shoe to pedal cleat mounting cleat comprise two or more sockets for receiving pins of the shim.

17. An improved bicycle shoe to pedal cleat first shim comprising a shim body with mating faces on opposite sides of the shim body, each for mating with another surface, each mating face having a plurality of shim-to-shim-keying-features, wherein the shim-to-shim-keying-features comprise two or more pins offset to the same side of a heel to toe centreline of the first shim on one of the mating faces, and wherein the shim-to-shim-keying-features comprise two or more sockets on the same mating face as the face with the pins and are for receiving pins of a second shim, wherein the sockets are on the opposite side of the heel to toe centreline as the pins of the first shim.

18. An improved bicycle shoe to pedal cleat first shim comprising a shim body with mating faces on opposite sides of the shim body, each for mating with another surface, each mating face having a plurality of shim-to-shim-keying-features, wherein the shim-to-shim-keying-features comprise two or more pins offset to the same side of a heel to toe centreline of the first shim on one of the mating faces, and wherein the shim-to-shim-keying-features comprise two or more sockets on the other mating face for receiving pins of a second shim, wherein the sockets are spaced symmetrically about the heel to toe centreline of the first shim.

* * * * *